(12) United States Patent
Liu et al.

(10) Patent No.: US 10,027,126 B2
(45) Date of Patent: Jul. 17, 2018

(54) MODULATION AND CONTROL METHODS FOR QUASI-Z-SOURCE CASCADE MULTILEVEL INVERTERS

(71) Applicant: QATAR FOUNDATION FOR EDUCATION, SCIENCE AND COMMUNITY DEVELOPMENT, Washington, DC (US)

(72) Inventors: Yushan Liu, Doha (QA); Haitham A. Abu-Rub, Doha (QA); Baoming Ge, College Station, TX (US)

(*) Notice: Subject to any disclaimer, the term of this patent is extended or adjusted under 35 U.S.C. 154(b) by 0 days.

(21) Appl. No.: 15/125,960

(22) PCT Filed: Mar. 12, 2015

(86) PCT No.: PCT/US2015/020212
§ 371 (c)(1),
(2) Date: Sep. 13, 2016

(87) PCT Pub. No.: WO2015/138744
PCT Pub. Date: Sep. 17, 2015

(65) Prior Publication Data
US 2017/0229871 A1 Aug. 10, 2017

Related U.S. Application Data

(60) Provisional application No. 61/952,613, filed on Mar. 13, 2014, provisional application No. 62/050,070, (Continued)

(51) Int. Cl.
*H02J 3/38* (2006.01)
*H02M 7/537* (2006.01)
(Continued)

(52) U.S. Cl.
CPC ............. *H02J 3/383* (2013.01); *H02M 7/483* (2013.01); *H02M 7/537* (2013.01); *H02M 2001/0048* (2013.01)

(58) Field of Classification Search
None
See application file for complete search history.

(56) References Cited

U.S. PATENT DOCUMENTS

| 5,111,374 A | 5/1992 | Lai et al. |
| 6,282,111 B1 | 8/2001 | Illingworth |

(Continued)

FOREIGN PATENT DOCUMENTS

| CN | 101917016 | 12/2010 |
| CN | 102097966 | 6/2011 |

(Continued)

OTHER PUBLICATIONS

Yushan Liu et al., "Phase-Shifted Pulse-Width-Amplitude Modulation for Quasi-Z-Source Cascade Multilevel Inverter based PV Power System", IEEE Energy Conversion Congess and Exposition, Sep. 15, 2013, pp. 94-100.

(Continued)

*Primary Examiner* — Rexford Barnie
*Assistant Examiner* — Swarna N Chowdhuri
(74) *Attorney, Agent, or Firm* — Richard C. Litman

(57) ABSTRACT

The modulation methods for quasi-Z-source cascade multilevel inverters relate to control and signal modulation of quasi-Z-source cascade multilevel inverters, such as those used with photovoltaic power systems. The modulation methods for quasi-Z-source cascade multilevel inverters include a modular multilevel space vector modulation method for a photovoltaic quasi-Z-source cascade multilevel inverter for compensating for unequal voltages of separate photovoltaic modules, a pulse-width-amplitude modulation (Continued)

method for multilevel inverters for use in solar panel arrays attached to a three phase power grid, and a grid-connected control method for quasi-Z-source cascade multilevel inverter-based photovoltaic power generation for extracting maximum power from each Z-source cascade multilevel inverter.

7 Claims, 25 Drawing Sheets

Related U.S. Application Data filed on Sep. 12, 2014, provisional application No. 62/082,591, filed on Nov. 20, 2014.

(51) Int. Cl.
*H02M 7/483* (2007.01)
*H02M 1/00* (2006.01)

(56) References Cited

U.S. PATENT DOCUMENTS

| | | | |
|---|---|---|---|
| 8,385,092 | B1 | 2/2013 | Shekhawat |
| 8,498,137 | B2 | 7/2013 | Joseph |
| 2013/0329477 | A1 | 12/2013 | Vinnikov et al. |
| 2015/0200602 | A1* | 7/2015 | Narimani ............ H02M 5/4585 363/37 |
| 2016/0126862 | A1* | 5/2016 | Vahedi ................. H02M 7/537 363/131 |

FOREIGN PATENT DOCUMENTS

| | | |
|---|---|---|
| CN | 102709941 | 10/2012 |
| EP | 2651025 | 10/2013 |
| JP | 2009-290919 | 12/2009 |
| KR | 10-2013-0105002 | 9/2013 |

OTHER PUBLICATIONS

Yushan Liu et al., "Phase-shifted pulse-width-amplitude modulation for quasi-Z-source cascade multilevel inverter-based photovoltaic power system", Power Electronics, IET, Jun. 2014, vol. 7, Iss. 6,pp. 1444-1456.
Ali, Quasi-Z-Source Inverter with Enhanced Voltage Gain for Photovoltaic Power Generation, Int. J. of Scientific & Engineering Research, vol. 4, Iss. 8, Aug. 2013, 6 pages.
Ghoreishy et al., "A Novel Pulse-Width and Amplitude Modulation (PWAM) Control Stategy for Power Converters", Journal of Power Electronics, vol. 10, No. 4, Jul. 2010, pp. 374-381.
Yushan Liu et al., "A Modular Multilevel Space Vector Modulation for Photovoltaic Quasi-Z-Source Cascade Multilevel Inverter", IEEE Applied Power Electronics Conference and Exposition, Mar. 17, 2013, pp. 714-718.
Dongsen Sun et al., "A New Grid-Connected PV System Based on Cascaded H-bridge Quasi-Z-Source Inverter", IEEE International Symposium on Industrial Electronics, May 28, 2012, pp. 951-956.

\* cited by examiner

MODULATION AND CONTROL METHODS FOR QUASI-Z-SOURCE CASCADE MULTILEVEL INVERTERS

TECHNICAL FIELD

The present invention relates to photovoltaic power systems, and particularly to modulation methods for quasi-Z-source cascade multilevel inverters, including a modular multilevel space vector modulation method for a photovoltaic quasi-Z-source cascade multilevel inverter for compensating for unequal voltages of separate photovoltaic modules, a pulse-width-amplitude modulation method for multilevel inverters for use in solar panel arrays attached to a three-phase power grid, and a grid-connected control method for quasi-Z-source cascade multilevel inverter-based photovoltaic power (PV) generation that controls space vector modulation signals applied to H-bridge switches for extracting maximum power from each quasi-Z-source PV inverter module.

BACKGROUND ART

Among renewable sources of energy, solar energy consistently shows great potential to serve as a clean and inexhaustible energy source. However, the efficiency of commercial photovoltaic (PV) panels is quite low, typically around 15-20%, and the output power of PV panels is greatly affected by environmental conditions, such as temperature and solar radiation. Partial shading is one of the main causes of losses in PV power generation systems and not only reduces the maximum output power of the shaded PV module, but causes maximum power point (MPP) voltage deviation in tandem or parallel PV strings of non-shaded cells, resulting in multiple power peaks in the power-voltage characteristics of PV modules and more complexity in PV systems.

Various inverter topologies have been proposed, or are currently used in PV systems, to increase efficiency and enhance reliability by tracking of the maximum power point of the panels, as well as reducing the switching frequency. A cascaded H-bridge multilevel inverter (CMLI) is one such inverter topology, and such an inverter topology is typically suitable for transformerless, grid-connected PV systems. Recently, the Z-source/quasi-Z-source cascade multilevel inverter (ZS-CMLI/qZS-CMLI) was developed, which inherits the advantages of traditional CMLI while overcoming issues with unequal PV panel voltages among independent modules and maintaining separate maximum power point tracking (MPPT) control for each H-bridge cell.

There are numerous pulse-width modulation (PWM) techniques for CMLIs available. These techniques can be divided into two categories: sine wave PWM (SPWM) and multilevel space vector modulation (MSVM). The SPWM-based multi-carrier PWM (MC-PWM) can be phase-shifted (PS), phase disposition (PD), phase opposition disposition (POD) or alternate phase disposition (APOD). The MSVM can be 60° coordinate transformation (DCT), reference vector decomposition (RVD), general vector (GV) or sample time staggered (STS). MC-PWM is relatively flexible. Thus, it has been generally employed in applications where the voltage levels are higher than five. However, the direct current (DC) link voltage utilization of MC-PWM is lower than that of MSVM, despite injecting third-order harmonics into modulation signals to improve utilization.

Combining the CMLI with a ZS/qZS network, an additional control freedom degree (i.e., the shoot-through duty ratio) needs to be considered for each H-bridge inverter (HBI) cell. The higher the cascaded level, the more hardware comparators are required. The MSVM technique has the advantages of ideal harmonic character and high voltage utilization, and is well suited for digital implementation for ZSI/qZSI. However, increasing cascaded levels causes the selection of space vectors and the calculation of switching time for traditional multilevel SVM to become more complicated. Although an STS-SVM technique based on traditional two-level SVM solves such issues to some extent, it demands higher capacity on the hardware storage due to the staggered sampling time. Thus, for the MC-SPWM and STS-SVM, a left and right bridge vector (LRBV) based MSVM was proposed.

Thus far, the only existing PWM technique for ZS-CMLI/qZS-CMLI is PS-SPWM, and it has been studied only in simulation. MSVM has never before been applied to ZS-CMLI/qZS-CMLI. It would be desirable to provide a multilevel SVM for qZS-CMLI, which can independently insert the shoot-through for each HBI cell, thus respectively compensating the unequal PV panel voltages with high voltage utilization and low harmonics.

FIG. 2 illustrates the topology of a typical n-layer three-phase qZS-CMLI based PV power generation system. In the topology of a qZS-CMLI shown in FIG. 2, each H-bridge module contains a quasi-Z-source network, and four power switches. The modulation technique of ZS/qZS-CMLI is typically required to get on-off signals of the four switches per module, for example.

As shown in FIG. 2, each cell is composed of the qZS-based HBI ($A_1, A_2, \ldots, A_n$) with separate PV panels ($B_1, B_2, \ldots, B_n$) and ($C_1, C_2, \ldots, C_n$) as DC sources. Therefore, the qZS-CMLI has the characteristics of both qZSI and CMLI, such that $\hat{v}_{DCxi}=(1/(1-2D_{xi}))v_{PVxi}=B_{xi}v_{PVxi}$; $V_{C1xi}=[(1-D_{xi})/(1-2D_{xi})]v_{PVxi}$ and $V_{C2xi}=[D_{xi}/(1-2D_{xi})]v_{PVxi}$; and $v_{xn}=v_{Hx1}+v_{Hx2}+\ldots+v_{Hxn}$, where $i \in \{1, 2, \ldots, n\}$ is the cascaded number, $x \in \{a, b, c\}$ represents the phase, $v_{PVxi}$ is the output voltage of each PV module, $D_{xi}$ and $B_{xi}$ represent the shoot-through duty ratio and boost factor per cell, $V_{C1xi}$ and $V_{C2xi}$ are the capacitor voltages, $v_{DCxi}$ (in FIG. 2) is the DC-link voltage of each qZS-HBI and $\hat{v}_{DCxi}$ is its peak value, $v_{Hxi}$ is the H-bridge output voltage, and $v_{xn}$ is the phase voltage of the qZS-CMLI.

Additionally, in qZS-CMI control, traditional pulse width modulation (PWM) compares a carrier, such as the commonly used triangle or sawtooth wave, with a desired modulation signal, such as sinusoidal wave. When the modulation signal is higher than the carrier, a high signal, denoted as "1", is generated. Conversely, for a low signal, a "0" is generated. The "1" and "0" are the signals to switch the power devices on and off. In this case, only the pulse width is modulated, and the pulse amplitude is held constant, since the ratio of modulation signal $V_m$ divided by the carrier $V_c$ (i.e., $V_m/V_c$) is invariable. Thus, traditional PWM methods result in inefficiencies, such as excessive switching losses and the like.

Further, the conventional cascade multilevel inverter (CMI) presents attractive features for photovoltaic power generation, such as high-quality step-like output voltage waveforms with lower harmonic distortions, lower requirement of power semiconductors, modular topology, etc. However, it lacks a voltage boost function, and shoot-through, i.e., a conduction phase of a switch during its transition between states, is inevitable because of the nature of the H-bridge topology. Photovoltaic systems are a problem for conventional power inverters due to the potentially large variations in the input power voltage. This presents inefficiencies that have yet to be overcome. An effective modulation method for a qZS-CMI photovoltaic power system that will maximize power efficiency from the cascaded inverters to synchronize with the grid is obviously desirable.

Thus, modulation and grid-tie control methods for quasi-Z-source cascade multilevel inverters addressing the aforementioned problems are desired.

DISCLOSURE OF INVENTION

In a first embodiment of the modulation methods for quasi-Z-source cascade multilevel inverters, a modular multilevel space vector modulation (SVM) method for a photovoltaic (PV) quasi-Z-source cascade multilevel inverter (qZS-CMLI) is provided. The SVM method for the PV qZS-CMLI independently inserts shoot-through for each H-bridge inverter (HBI) cell of a PV system, thus respectively compensating unequal PV panel voltages of the PV system with high voltage utilization and low harmonics. The modular multilevel SVM method for a PV qZS-CMLI uses two-level SVM to independently control the shoot-through duty ratio of respective HBI cells, and is modularly extended to any cascaded levels.

The modular multilevel space vector modulation method for a photovoltaic quasi-Z-source cascade multilevel inverter includes the following steps: (a) generating a first switching signal for an upper left set of switches of each quasi-Z-source H-bridge inverter cell of a quasi-Z-source cascade multilevel inverter at a time $T_0/4 - T_{sh}/4$ within a control cycle $T_s$ of the quasi-Z-source H-bridge inverter cell, where $T_0$ is an unmodified switching time interval of a zero state of the quasi-Z-source H-bridge inverter cell and $T_{sh}$ is a time of shoot-through zero states of the quasi-Z-source H-bridge inverter cell; (b) comparing the first switching signal with a triangular carrier signal over the control cycle $T_s$ and turning the upper left set of switches on if the triangular carrier signal is higher than the first switching signal and turning the upper left set of switches off if the triangular carrier signal is lower than the first switching signal; (c) generating a second switching signal for an upper right set of switches of the quasi-Z-source H-bridge inverter cell at a time $T_s/2 - T_0/4$ within the control cycle $T_s$ of the quasi-Z-source H-bridge inverter cell; (d) comparing the second switching signal with the triangular carrier signal over the control cycle $T_s$ and turning the upper right set of switches on if the triangular carrier signal is higher than the second switching signal and turning the upper right set of switches off if the triangular carrier signal is lower than the second switching signal; (e) generating a third switching signal for a lower left set of switches of the quasi-Z-source H-bridge inverter cell at a time $T_0/4$ within the control cycle $T_s$ of the quasi-Z-source H-bridge inverter cell; (f) comparing the third switching signal with the triangular carrier signal over the control cycle $T_s$ and turning the lower left set of switches on if the triangular carrier signal is higher than the third switching signal and turning the lower left set of switches off if the triangular carrier signal is lower than the third switching signal; (g) generating a fourth switching signal for a lower right set of switches of the quasi-Z-source H-bridge inverter cell at a time $T_s/2 - T_0/4 + T_{sh}/4$ within the control cycle $T_s$ of the quasi-Z-source H-bridge inverter cell; and (h) comparing the fourth switching signal with the triangular carrier signal over the control cycle $T_s$ and turning the lower right set of switches on if the triangular carrier signal is higher than the fourth switching signal and turning the lower right set of switches off if the triangular carrier signal is lower than the fourth switching signal.

A second embodiment of the control and modulation methods for quasi-Z-source cascade multilevel inverters relates to a pulse-width-amplitude modulation method for quasi-Z-source cascade multilevel inverters, which provides phase-shifted pulse-width-amplitude modulation (PS-PWAM) for a quasi-Z-source cascade multilevel inverter (qZS-CMI)-based photovoltaic power system. The PS-PWAM method for ZS/qZS-CMI achieves lower switching loss and higher voltage utilization than the traditional phase shifted-sinusoidal pulse width modulation (PS-SPWM) method. The method may also be applied to traditional CMI. The modulation technique of ZS/qZS-CMI is required to get on-off signals of the four switches per module. The switching actions of each power device of the qZS-CMI in the PS-PWAM technique are greatly reduced when compared with that in the phase-shifted sine wave pulse width modulation. Thus, the qZS-CMI's power loss is reduced when using PS-PWAM.

In the pulse-width-amplitude modulation method for quasi-Z-source cascade multilevel inverters, the carrier amplitudes for a quasi-Z-source cascade multilevel inverter are varied between top and bottom amplitudes of three-phase modulating signals for left and right inverter H-bridge legs of the quasi-Z-source cascade multilevel inverter. Boost control is implemented for a phase-shifted-pulse width amplitude modulating signal if shoot-through references exceed predetermined minimum and maximum threshold values. For a maximum amplitude of the three-phase modulating signal, an upper switch of the left inverter H bridge leg is in an "on" state and a lower switch of the left inverter H bridge leg is turned on if the shoot-through references are less than the predetermined minimum threshold values to initiate a shoot-through. For a minimum amplitude of the three-phase modulating signal, the upper switch of the left inverter H bridge leg is turned on if the shoot-through references are greater than the predetermined minimum threshold values to initiate a shoot-through and the lower switch of the left inverter H bridge leg is in an "on" state. For the maximum amplitude of the three-phase modulating signal, an upper switch of the right inverter H bridge leg is turned on if the shoot-through references are less than the predetermined minimum threshold values to initiate a shoot-through and a lower switch of the right inverter H bridge leg is in the "on" state. For the minimum amplitude of the three-phase modulating signal, the upper switch of the right inverter H bridge leg is in the "on" state and the lower switch of the right inverter H bridge leg is on if the shoot-through references are greater than the predetermined maximum threshold values to initiate a shoot-through.

A third embodiment of the control and modulation methods for quasi-Z-source cascade multilevel inverters relates to a grid-connected control method for quasi-Z-source cascade multilevel inverter-based photovoltaic power generation for extracting maximum power from each quasi-Z-source PV inverter module. The grid-connected control method for quasi-Z-source (qZS) cascade multilevel inverter-based (CMI-based) photovoltaic (PV) power generation uses n modulation signals and n shoot-through duty ratios for n PV modules to produce proper switching signals by space vector modulation (SVM) for control of the on-off states of the inverter power switches for a single phase output. In this way, DC-link voltage is adjusted independently, while the PV panel power tracks the maximum power point for each module. PI (proportional integral) controllers for modules 2 through n receive voltage loop and phase lock inputs from a grid voltage $v_g$. Output signals of PI controllers 2 through n are used to produce space vector modulation (SVM) signals controlling H-bridge switches of PV modules 2 through n, tracking their own maximum power points separately. The first PV module SVM signal is obtained from a sum of the remaining modulation signals, grid-tie current loop output, obtained from a total voltage loop modulation reference $v_{mt}$, and the unit grid voltage $v_g$.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

A first embodiment of the control and modulation methods for quasi-Z-source cascade multilevel inverters relates to a modular multilevel space vector modulation (SVM) method for a photovoltaic (PV) quasi-Z-source cascade multilevel inverter (qZS-CMLI).

Figure 1:
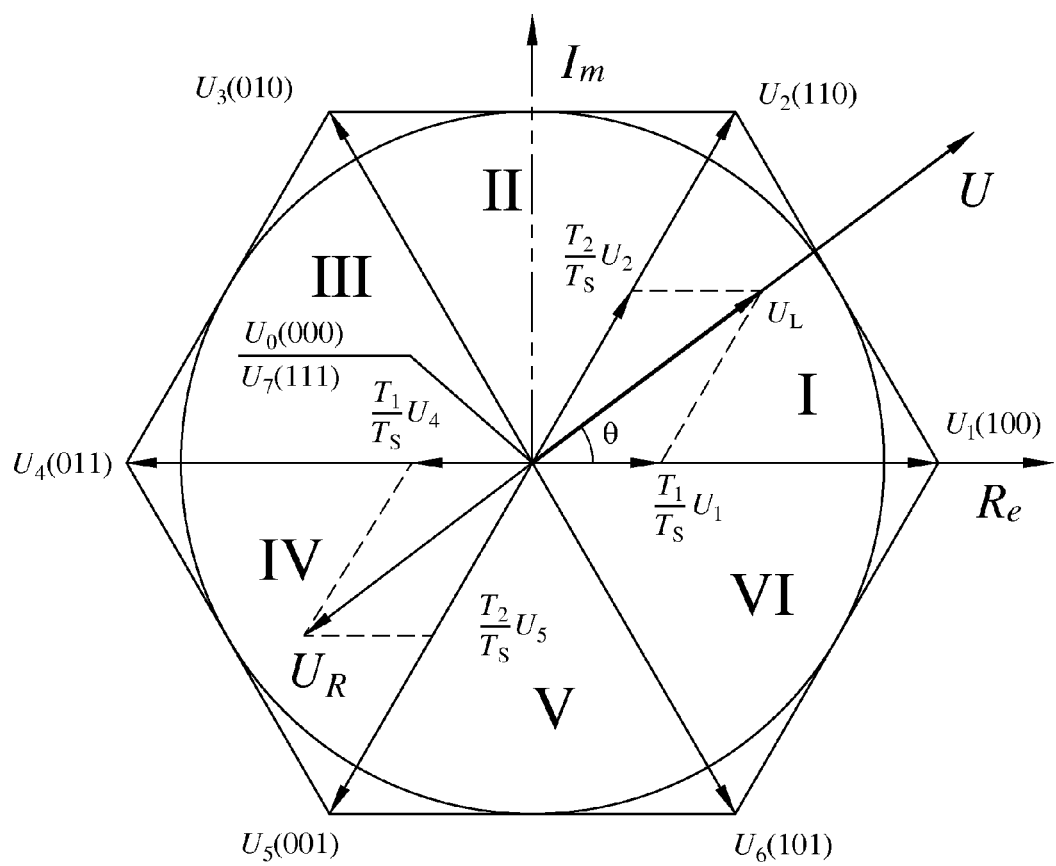
FIG. 1 diagrammatically illustrates vectors of a left-right-bridge-vector (LRBV) based space vector modulation for a single layer of a modular multilevel space vector modulation method for a photovoltaic quasi-Z-source cascade multilevel inverter according to a first embodiment of the present invention.
Figure 2:
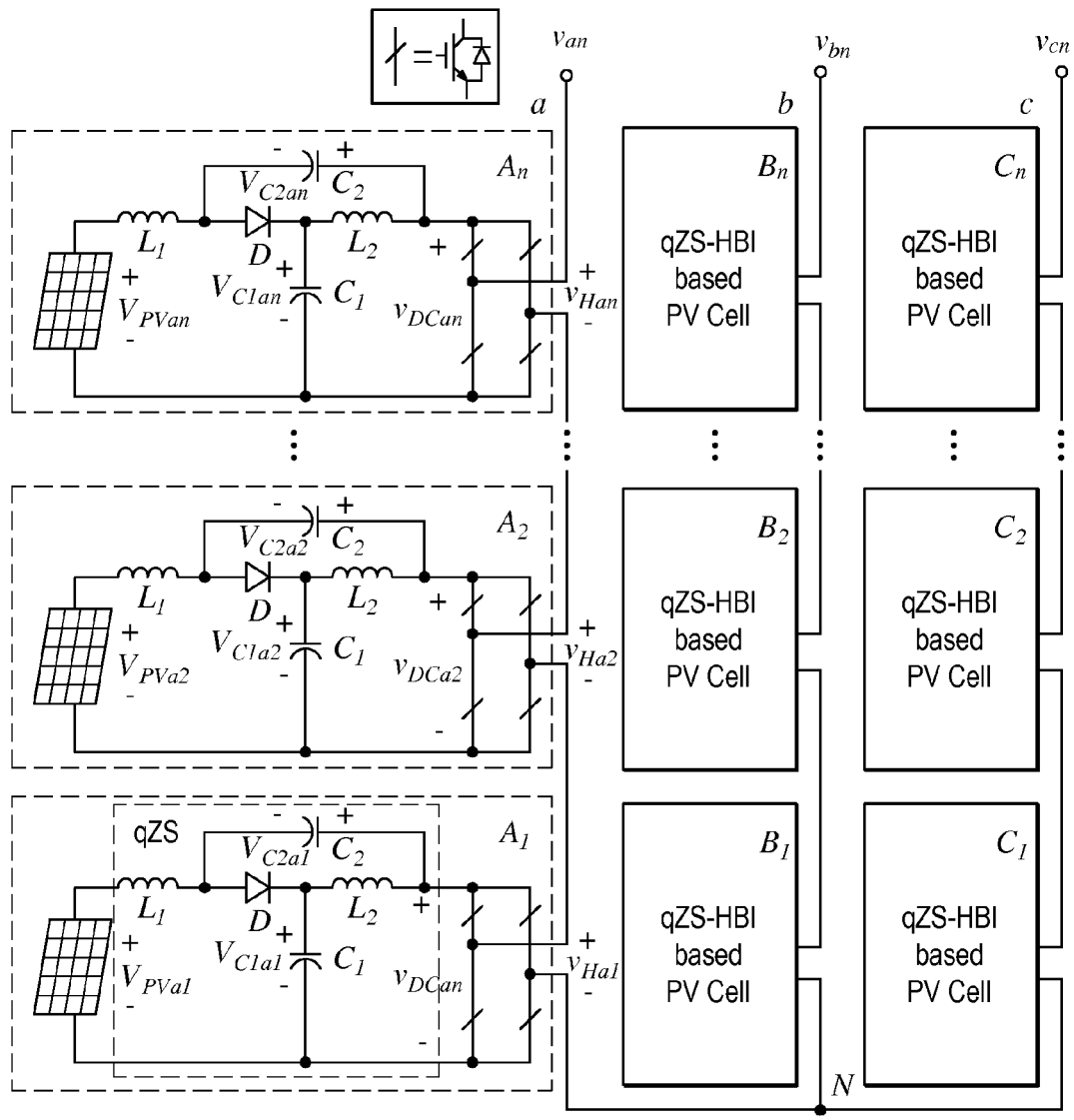
FIG. 2 is a schematic diagram illustrating a conventional n-layer quasi-Z-source cascade multilevel inverter (qZS-CMLI).

Prior to developing the modular multilevel space vector modulation method for a photovoltaic quasi-Z-source cascade multilevel inverter, a single layer quasi-Z-source cascade multilevel inverter (qZS-CMLI) is examined, such as, for example, the first layer of the n-layer qZS-CMLI of FIG. 2. For this first layer, the six bridges can be divided into two groups: left bridges $L_a$, $L_b$ and $L_c$, and right bridges $R_a$, $R_b$ and $R_c$. Each group is separately controlled by a three-phase two-level space vector modulation (SVM), thus two space vectors can be generated; i.e., left bridge vector $U_L$ and right bridge vector $U_R$, as shown in FIG. 1. Concurrently, two groups of switching times are respectively generated; i.e., the left bridge switching times per phase $T_L$ ($t_{La}$, $t_{Lb}$, $t_{Lc}$) and right bridge switching times per phase $T_R$ ($t_{Ra}$, $t_{Rb}$, $t_{Rc}$).

In order to buck/boost direct current (DC) link peak voltage of the quasi-Z-source H-bridge inverter (qZS-HBI) cell to balance the voltages from separate photovoltaic (PV) panels, shoot-through states need to be introduced into the upper and lower switches of one bridge. To modularly insert the shoot-through into each cell, the switching times for each cell are extracted from $T_L$ and $T_R$. Consequently, three new groups of switching times are generated; i.e., $T_a\{t_{La}, t_{Ra}\}$, $T_b\{t_{Lb}, t_{Rb}\}$, and $T_c\{t_{Lc}, t_{Rc}\}$. During each control cycle, the time of shoot-through zero states $T_{sh}$ is equally divided into four parts and inserted into the left and right bridges of the same cell, such as being introduced into transition moments of active states and zero states, as illustrated in FIG. 3, for example.

Figure 3:
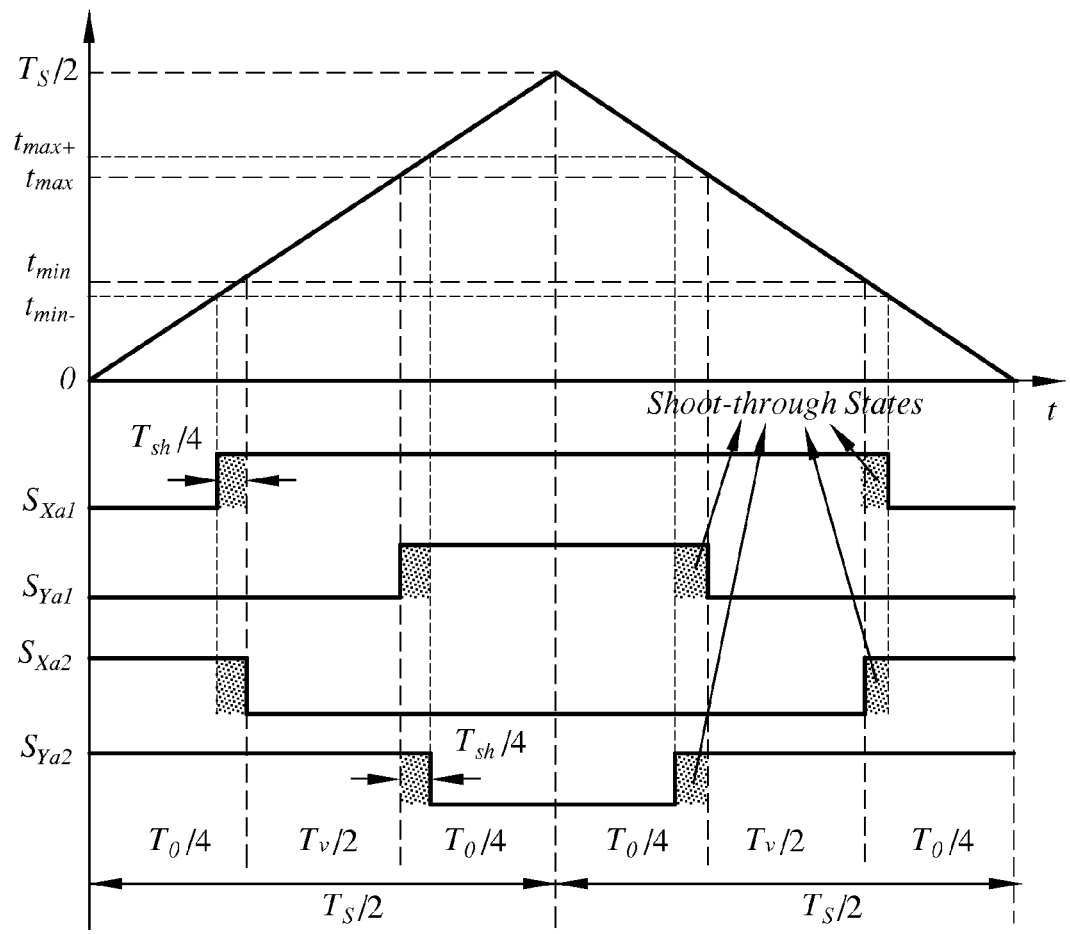
FIG. 3 is a graph illustrating switching times of a single quasi-Z-source H-bridge inverter (qZS-HBI) cell in the modular multilevel space vector modulation method for a photovoltaic quasi-Z-source cascade multilevel inverter according to the first embodiment of the present invention.

Taking the cell $A_1$ as an example, the modification of switching times is shown in FIG. 3. In FIG. 3, $t_{min} \in \min\{t_{La}, t_{Ra}\}$ and $t_{max} \in \max\{t_{La}, t_{Ra}\}$, $t_{min-}$ and $t_{max+}$ are the modified times for inserting shoot-through states, $T_v$ is the time interval of valid vector, $S_{Xa1}$ and $S_{Ya1}$ are the switching control signals for the upper switches of cell $A_1$, and $S_{Xa2}$ and $S_{Ya2}$ are the switching control signals for the lower switches of cell A1, and $\{X, Y\} \in \{L, R\}$. In this way, the shoot-through states can be respectively inserted into each qZS-HBI, which is particularly favorable to independently buck/boost the unequal voltages of PV panels, such as can be relatively very favorable to independently compensate the unequal voltages of separate DC sources, for example.

Figure 4:
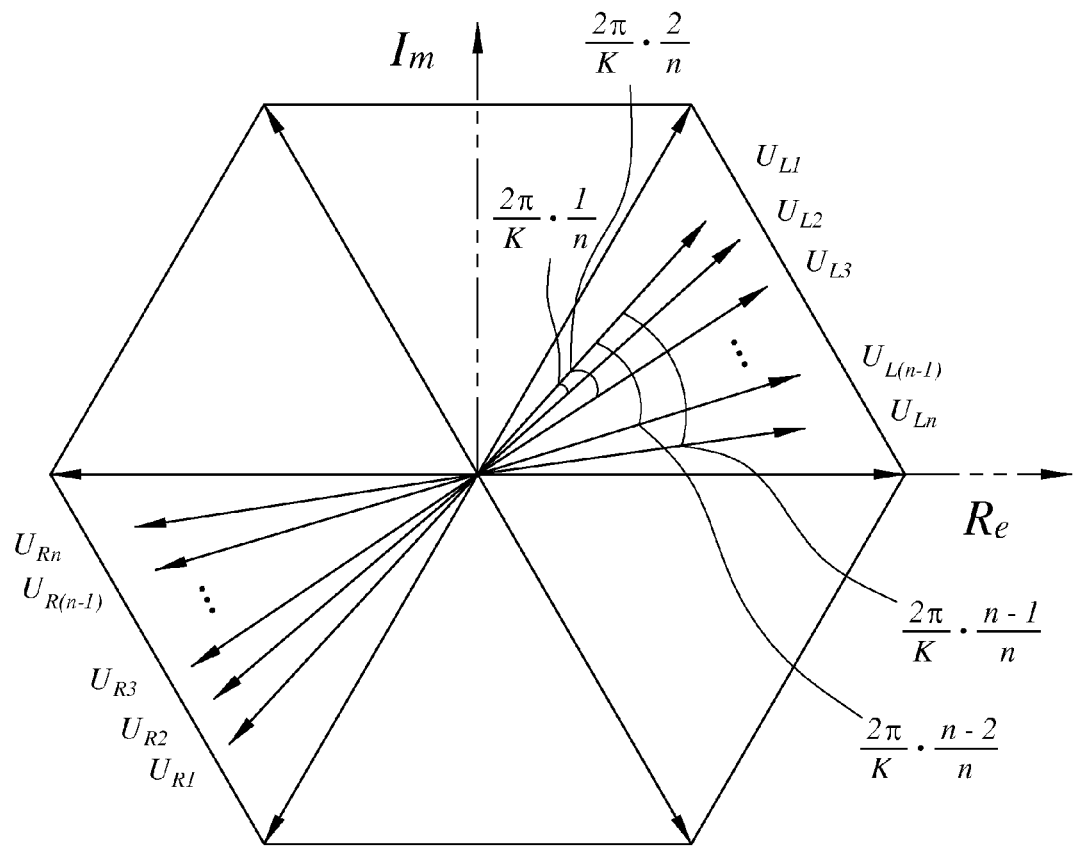
FIG. 4 diagrammatically illustrates vectors of a left-right-bridge-vector (LRBV) based space vector modulation for multiple layers of the modular multilevel space vector modulation method for a photovoltaic quasi-Z-source cascade multilevel inverter according to the first embodiment of the present invention.

The extension of left-right-bridge-vector (LRBV) based space vector modulation (SVM) for an n-layer qZS-CMLI is diagrammatically illustrated in FIG. 4. The voltage vectors are composed of n left bridge vectors (LBVs) and n right bridge vectors (RBVs). The LBVs and RBVs of the same cell have a 180° phase difference. Additionally, the voltage vectors between two adjacent left layers have a phase difference of $2\pi/(nK)$, where K is the number of reference voltages in each cycle. Likewise, the adjacent two layers of the right bridges have an identical phase difference.

To insert the shoot-through states into each qZS-HBI cell, the independent pattern, as in FIG. 3, is applied to the related left and right bridges of each cell. The shoot-through duty ratio can reach the maximum duty ratio of a traditional zero state, which is beneficial to maximize the boost factor for any given modulation index to achieve the maximum voltage gain. Therefore, embodiments of a modular multilevel space vector modulation method for a photovoltaic quasi-Z-source cascade multilevel inverter can have various advantages of a traditional SVM, such as high voltage utilization and low harmonics, as well as can separately insert shoot-through states into ZS/qZS-CMLI in a relatively simple way substantially without additional switching losses than that of a traditional voltage source inverter (VSI), for example.

As noted above, FIG. 3 shows the generation of switching timing of one qZS-HBI cell of the present method, as can be applied to embodiments of a modular multilevel space vector modulation method for a photovoltaic quasi-Z-source cascade multilevel inverter, such as can be applied to an n-layer qZS-CMLI. As an example, when the voltage vector is in Section I of FIG. 1, as can also be applied to voltage vectors in other sections, the switching timing operates as follows: (a) generating a first switching signal for an upper left set of switches of each quasi-Z-source H-bridge inverter cell of a quasi-Z-source cascade multilevel inverter at a time $T_0/4 - T_{sh}/4$ within a control cycle $T_s$ of the quasi-Z-source H-bridge inverter cell, where $T_0$ is an unmodified switching time interval of a zero state of the quasi-Z-source H-bridge inverter cell and $T_{sh}$ is a time of shoot-through zero states of the quasi-Z-source H-bridge inverter cell; (b) comparing the first switching signal with a triangular carrier signal over the control cycle $T_s$ and turning the upper left set of switches on if the triangular carrier signal is higher than the first switching signal and turning the upper left set of switches off if the triangular carrier signal is lower than the first switching signal; (c) generating a second switching signal for an upper right set of switches of the quasi-Z-source H-bridge inverter cell at a time $T_s/2 - T_0/4$ within the control cycle $T_s$ of the quasi-Z-source H-bridge inverter cell; (d) comparing the second switching signal with the triangular carrier signal over the control cycle $T_s$ and turning the upper right set of switches on if the triangular carrier signal is higher than the second switching signal and turning the upper right set of switches off if the triangular carrier signal is lower than the second switching signal; (e) generating a third switching signal for a lower left set of switches of the quasi-Z-source H-bridge inverter cell at a time $T_0/4$ within the control cycle $T_s$ of the quasi-Z-source H-bridge inverter cell; (f) comparing the third switching signal with the triangular carrier signal over the control cycle $T_s$ and turning the lower left set of switches on if the triangular carrier signal is higher than the third switching signal and turning the lower left set of switches off if the triangular carrier signal is lower than the third switching signal; (g) generating a fourth switching signal for a lower right set of switches of the quasi-Z-source H-bridge inverter cell at a time $T_s/2 - T_0/4 + T_{sh}/4$ within the control cycle $T_s$ of the quasi-Z-source H-bridge inverter cell; and (h) comparing the fourth switching signal with the triangular carrier signal over the control cycle $T_s$ and turning the lower right set of switches on if the triangular carrier signal is higher than the fourth switching signal and turning the lower right set of switches off if the triangular carrier signal is lower than the fourth switching signal.

A three-phase seven-level qZS-CMLI for PV power generation system with an LC filter and an RL load was simulated using MATLAB/Simulink. The system specifications used in the simulation are given below in Table 1. The simulations involved two separate cases, namely balanced and imbalanced PV panel voltages. The present SVM method was also compared with a conventional phase-shifted sine wave pulse-width modulation (PS-SPWM) method for qZS-CMLI.

TABLE 1

System Specifications for Simulation

| Circuit Parameter | Value |
|---|---|
| Minimal PV panel voltage $V_{PV, min}$ | 60 V |
| Maximum PV panel voltage $V_{PV, max}$ | 120 V |
| RMS of line voltage | 400 V |
| Q-ZS inductance | 1.8 mH |
| Q-ZS capacitance | 3300 µF |
| Filter inductance $L_f$ | 1 mH |
| Filter capacitance $C_f$ | 10 µF |
| Load resistance $R_L$ | 20 Ω |
| Modulation index M | 0.8 |
| Carrier frequency $f_c$ | 10 kHz |

Figure 5A:
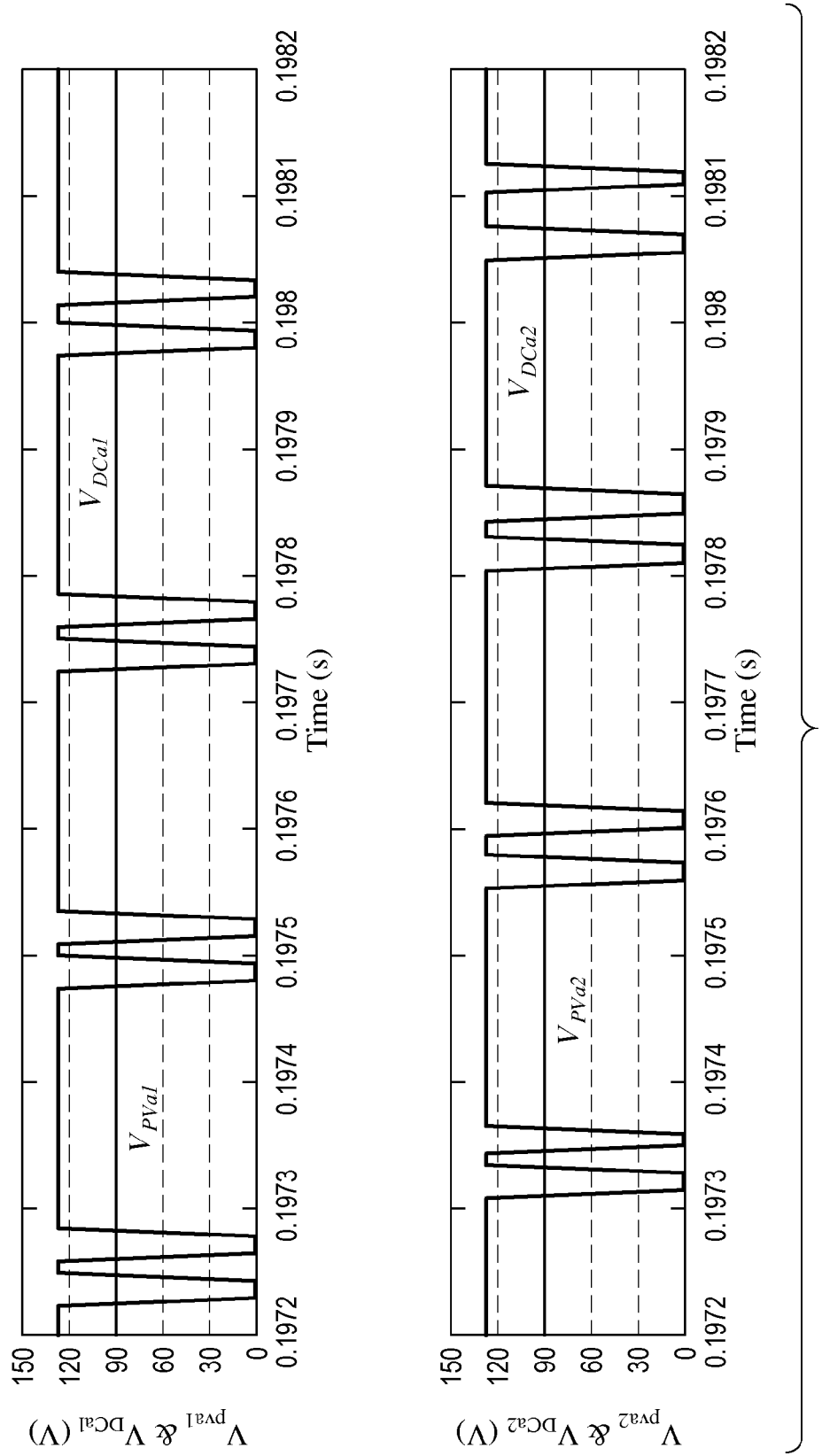
FIG. 5A is a graph comparing PV panel voltages and DC-link voltages over two control cycles for a PV panel voltage balanced by the modular multilevel space vector modulation method for a photovoltaic quasi-Z-source cascade multilevel inverter according to the first embodiment of the present invention.
Figure 5B:
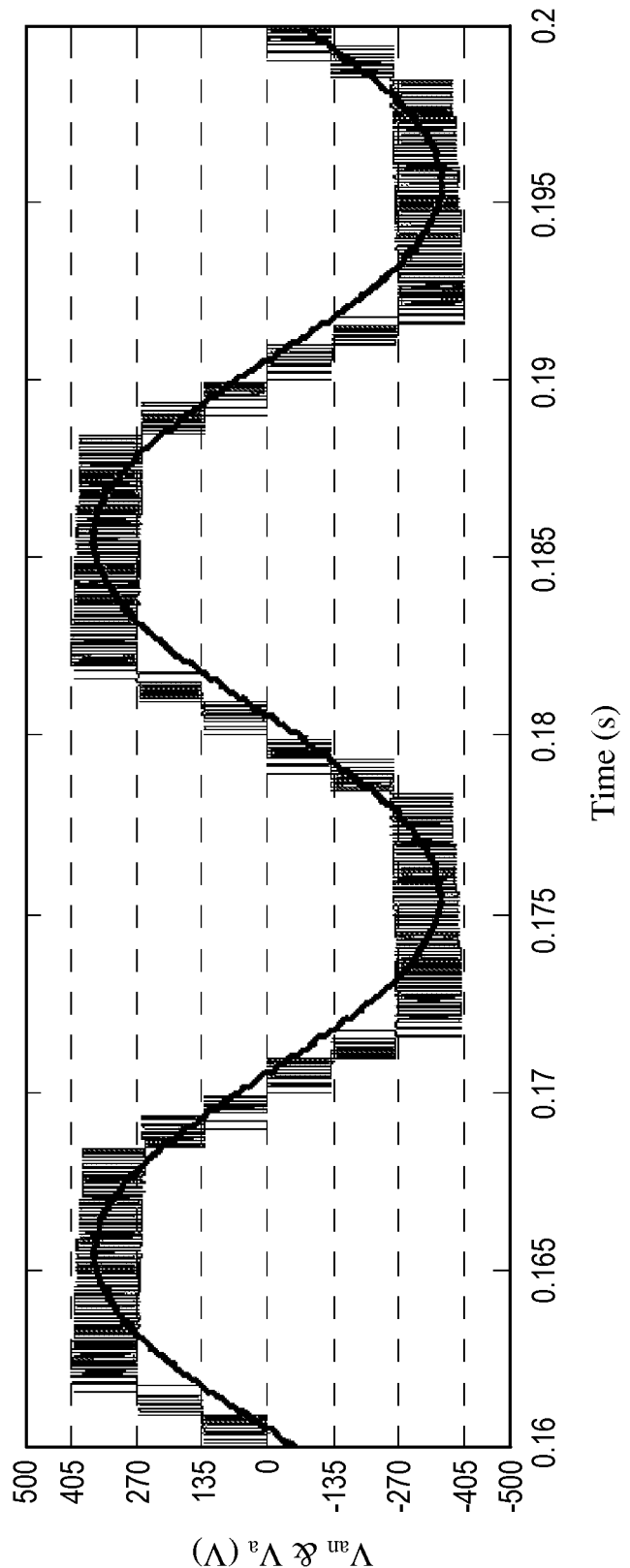
FIG. 5B is a graph showing seven-level staircase voltage and load voltage of phase A for the balanced PV panel voltage of FIG. 5A.

For the first case of balanced PV voltages, the PV panel voltages of all the cells were set to 90 V. In order to get the 400 V line voltage, a 135 V DC-link peak voltage is required (from equations (1)-(3)) for each qZS-HBI. Thus, the shoot-through duty ratio of an individual cell is 0.17. Taking two cells $A_1$ and $A_2$ as an example, the PV panel voltages $v_{PVA1}$ and $v_{PVA2}$, respectively, with the related DC-link voltages in two control cycles are shown in FIG. 5A, and the 7-level staircase voltage waveform and the load voltage of phase A are shown in FIG. 5B. It can be seen that at the same PV panel voltages, each DC-link peak voltage is boosted to the desired value with the same shoot-through time intervals. The output phase voltage has seven levels with equal voltage differences between the adjacent levels, as shown in FIG. 5B.

Figure 6A:
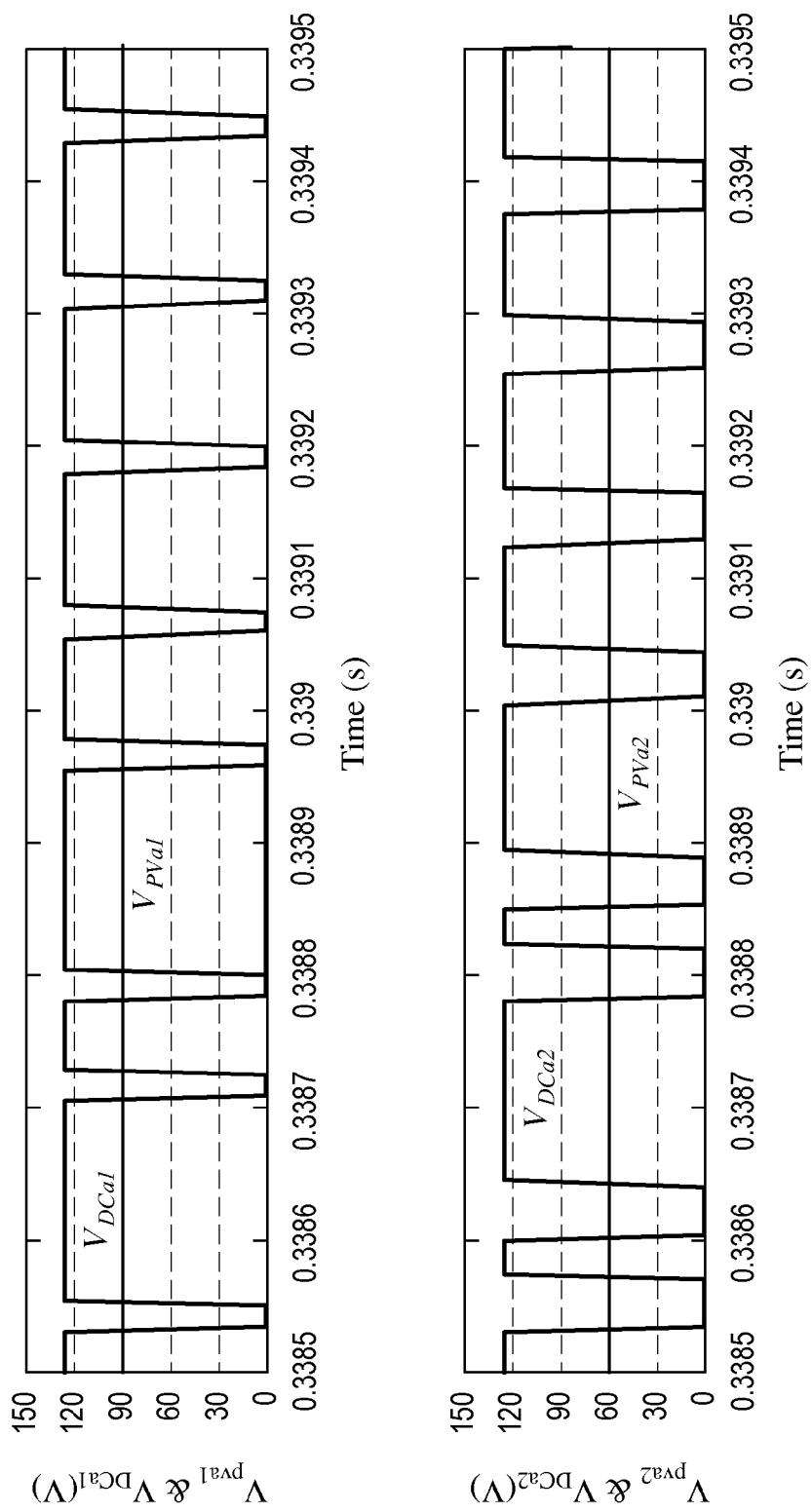
FIG. 6A is a graph comparing simulated PV panel voltages and DC-link voltages over two control cycles for a PV panel voltage under imbalance.
Figure 6B:
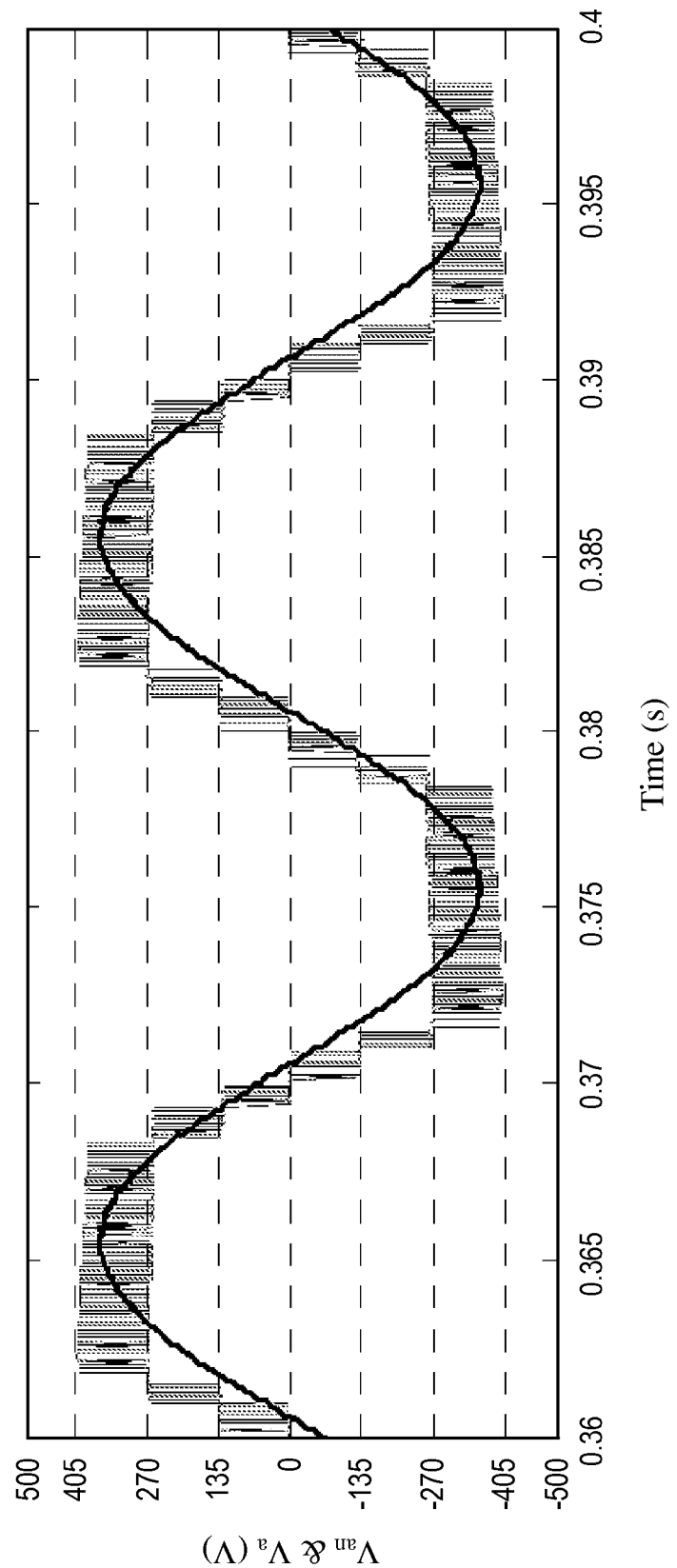
FIG. 6B is a graph showing seven-level staircase voltage and load voltage of phase A for the imbalanced PV panel voltage of FIG. 6A.

For the second case of imbalanced PV voltages, the simulated results are shown in FIGS. 6A and 6B, where the voltage $v_{PVA2}$ of cell $A_2$ is set to 60 V and all other cell voltages are maintained at 90 V. From equation (1), in order to get the 135 V DC-link peak voltage, the shoot-through duty ratio of cell $A_2$ is 0.28. In FIG. 6A, the shoot-through time interval of cell $A_2$ is longer than that of cell $A_1$, and the DC-link peak voltage is boosted to the required value, without affecting the voltage differences between the adjacent levels, as shown in FIG. 6B.

Figure 7A:
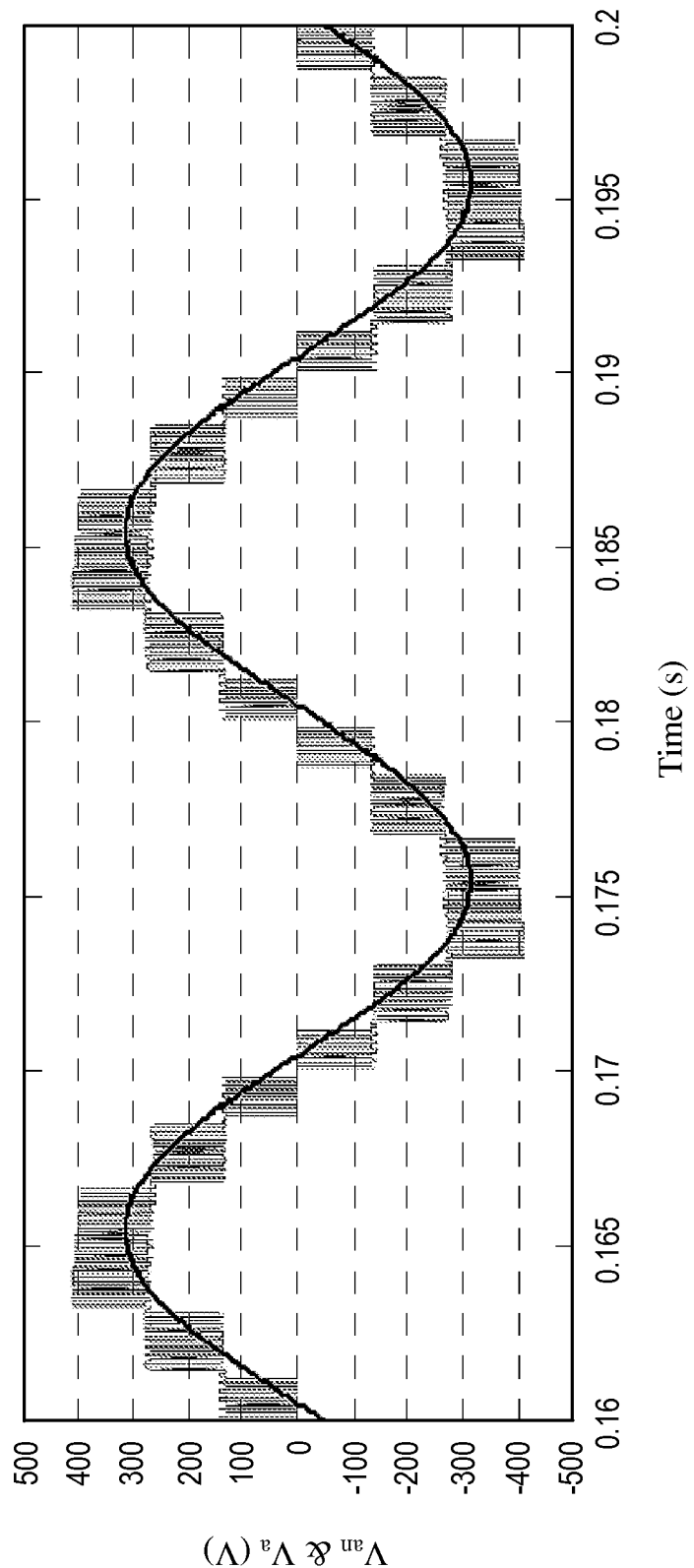
FIG. 7A is a graph illustrating staircase voltage and load voltage of a conventional phase-shifted sine wave pulse-width modulation (PS-SPWM) technique.
Figure 7B:
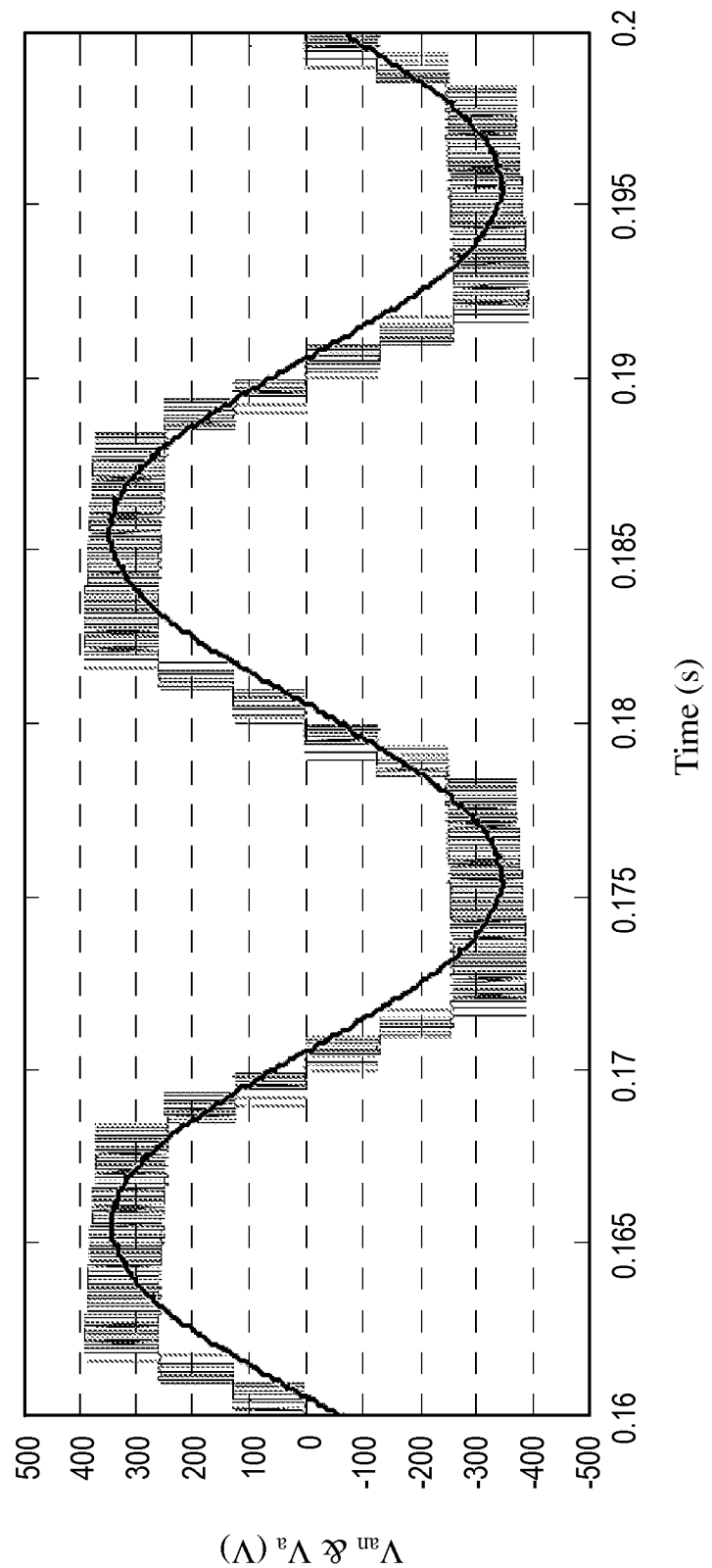
FIG. 7B is a graph illustrating staircase voltage and load voltage of the modular multilevel space vector modulation method for a photovoltaic quasi-Z-source cascade multilevel inverter according to the first embodiment of the present invention.

Comparing the present method against a conventional PS-SPWM, the PS-SPWM for ZS-CMLI/qZS-CMLI inserts the shoot-through states when the carrier triangle wave is greater than the upper shoot-through envelope or smaller than the lower shoot-through envelope, and generates multilevel control signals by the carrier phase shifting. The comparison of this technique with the present method is shown in FIG. 7A compared with FIG. 7B, respectively. For this comparison, both techniques were applied to the same 90 V PV panel voltages for all qZS-HBI cells. Comparing the results of FIG. 7A with FIG. 7B, it can be seen that the present inventive method provides higher voltage utilization, since the amplitude of load voltage is much higher than 300 V, while that of the PS-SPWM based system is near 300 V, for example.

A 5-level qZS-CMLI was constructed for experimental purposes. A control board of the circuit integrated a TMS320F28335 digital signal processor (DSP) and an ALTERA EPM3128A complex programmable logic device (CPLD). The cases of balanced and imbalanced PV panel voltages were tested by DC power suppliers that simulate PV panels. The experimental results are shown in FIGS. 8A, 8B, 9A and 9B, where all voltages are 20 V/div.

Figure 8A:
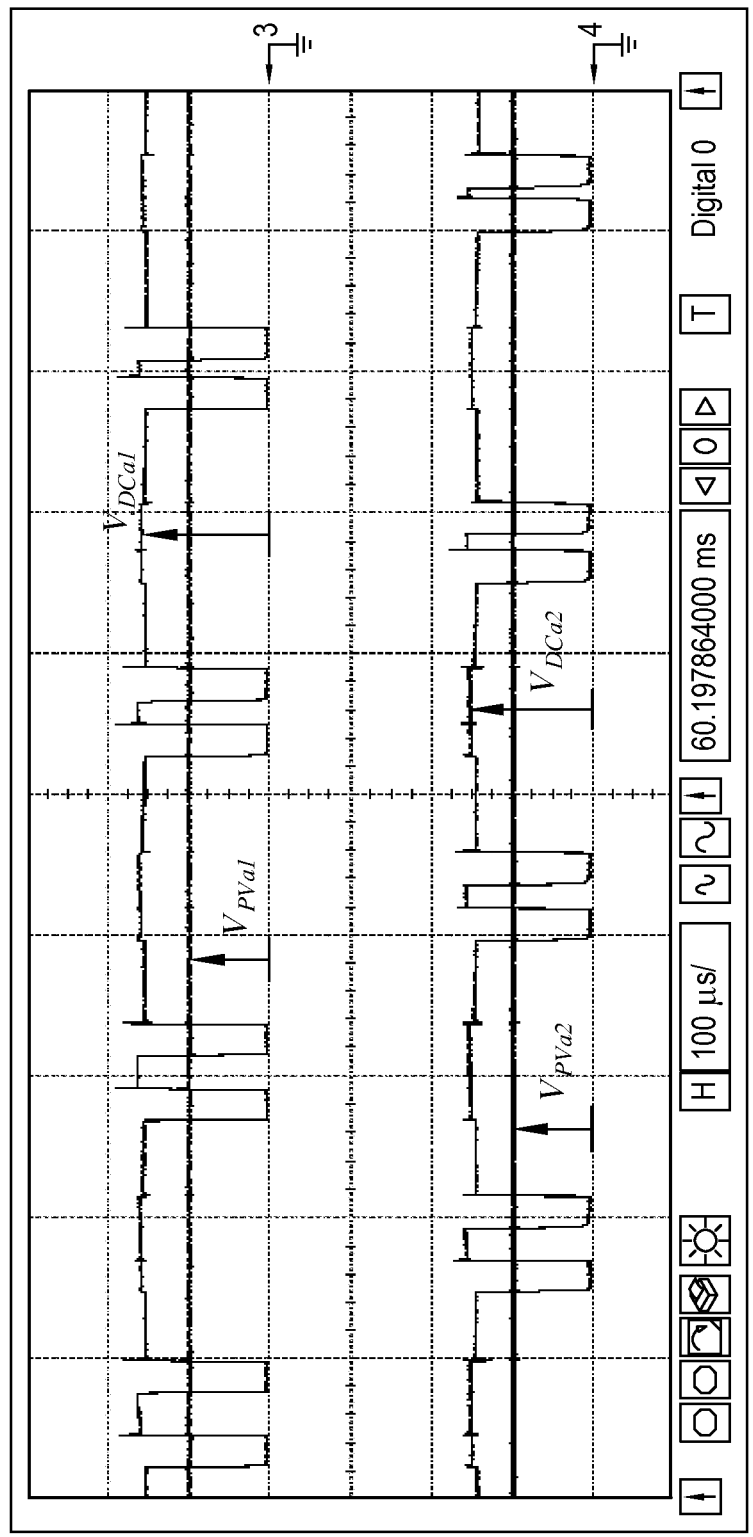
FIG. 8A is a graph showing PV panel voltages and DC-link voltages over two control cycles for a PV panel voltage balanced by the modular multilevel space vector modulation method for a photovoltaic quasi-Z-source cascade multilevel inverter according to the first embodiment of the present invention.
Figure 8B:
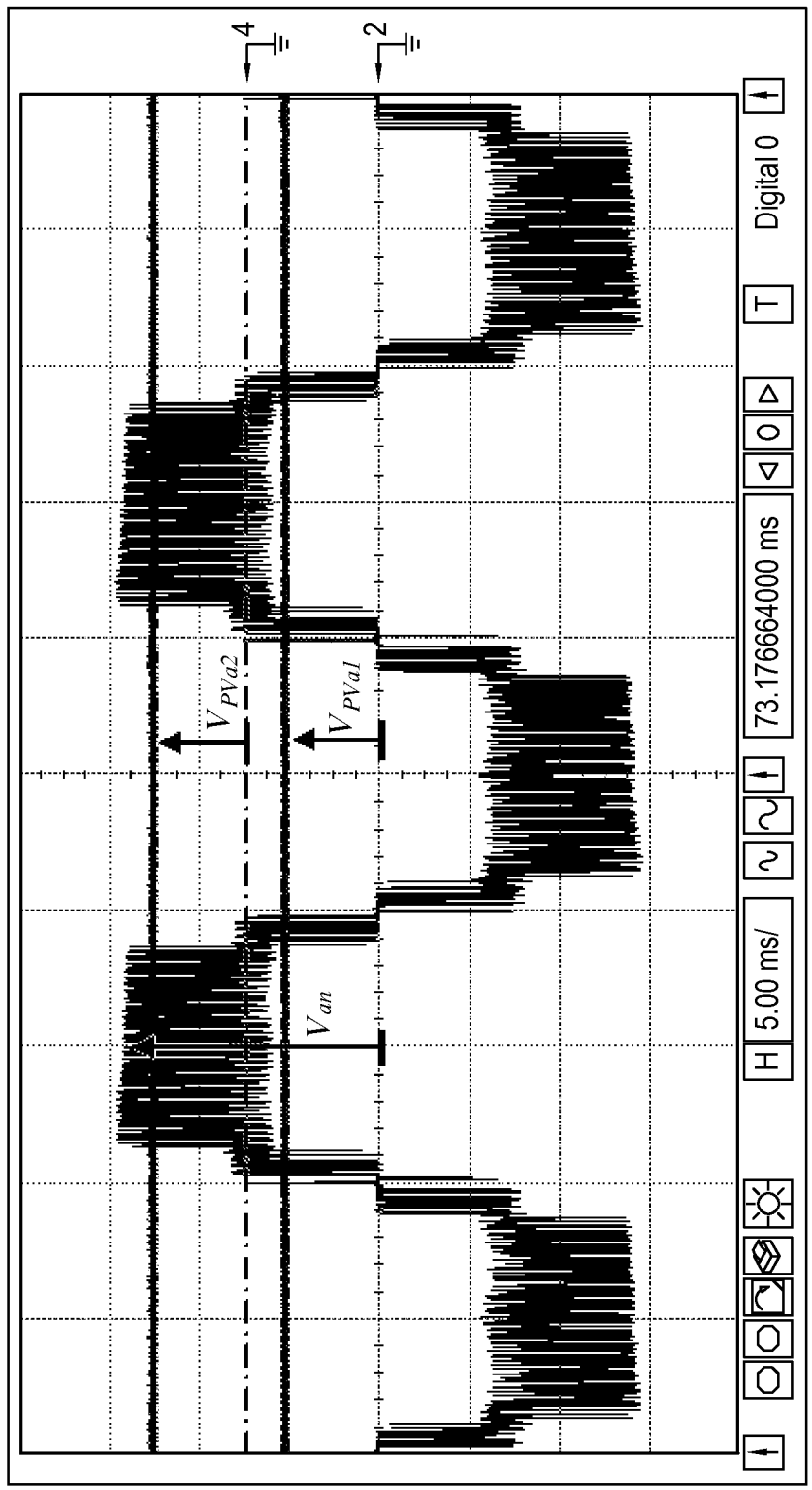
FIG. 8B is a graph showing a five-level step-like voltage for the balanced PV panel voltage of FIG. 8A.
Figure 9A:
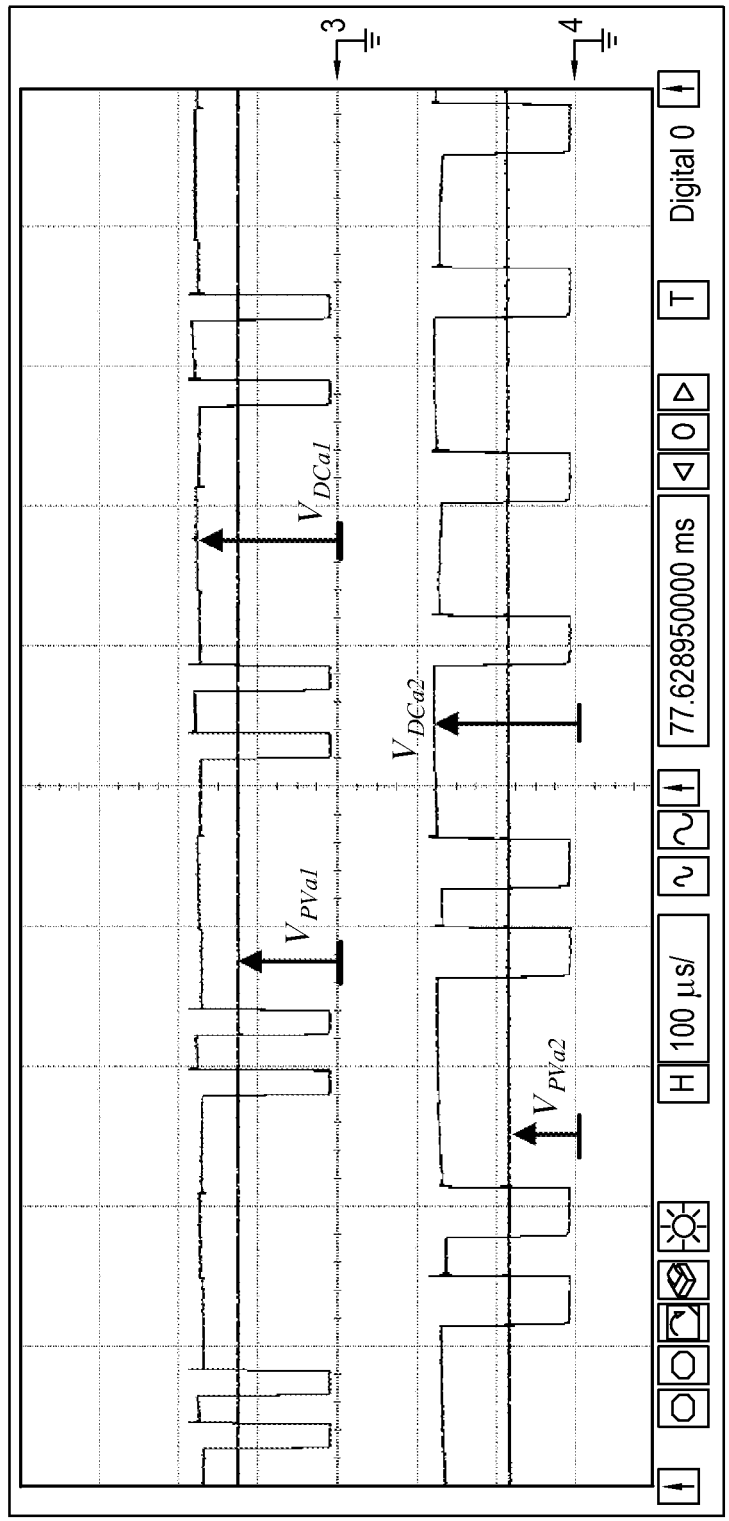
FIG. 9A is a graph showing PV panel voltages and DC-link voltages over two control cycles for a PV panel voltage under imbalance.
Figure 9B:
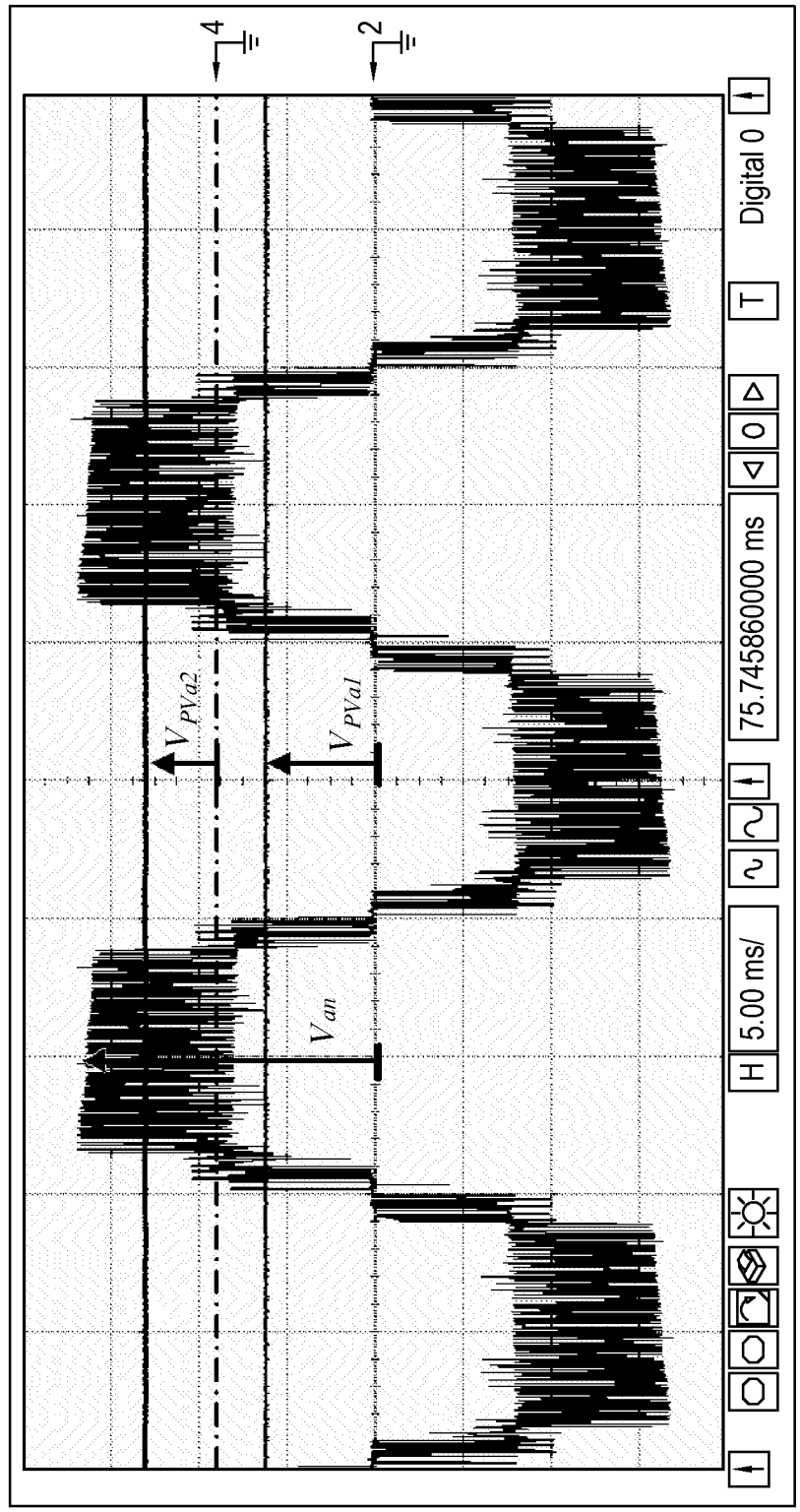
FIG. 9B is a graph showing a five-level step-like voltage for the imbalanced PV panel voltage of FIG. 9A.

FIGS. 8A and 8B show the results of all qZS-CMLIs working at 20 V PV panel voltages and a shoot-through duty ratio of 0.17 to get a 30 V DC-link peak voltage, taking cells $A_1$ and $A_2$ as an example. It can be seen that the DC-link peak voltages are boosted to 30 V with equal voltage differences between the adjacent levels. FIGS. 9A and 9B show the results when a 17 V voltage was supplied to cell or module $A_2$, while the other cells or modules had voltages of 25 V, and the desired DC-link peak voltage was 35 V. In FIG. 9A, the DC-link peak voltage of module $A_2$ was boosted to be the same as the other cells with longer shoot-through time intervals. In this way, the voltage drop of the PV panel does not make a difference to the 5-level step-like voltage, as seen in FIG. 9B.

The embodiments of a modular multilevel space vector modulation method for a photovoltaic quasi-Z-source cascade multilevel inverter can provide relatively high efficiency, relatively high voltage utilization, relatively low harmonics, and can minimize additional resources for Z-Source/quasi-Z-source cascade multilevel inverter (ZS/qZS-CMLI), for example.

Also, the modular multilevel space vector modulation method for a photovoltaic quasi-Z-source cascade multilevel inverter can likewise provide for the shoot-through states to be respectively inserted into each qZS-HBI module, and can minimize a need for additional switching actions and controller resources, and can reduce losses related to additional switching actions, while preserving advantages of a SVM, such as with respect to relatively high voltage utilization, relatively low harmonics, and relatively simple digital implementation, for example. Further, the present method can enhance maximizing utilization of a zero vector duty ratio, and can thereby maximize the boost factor, for example.

Moreover, the embodiments of a modular multilevel space vector modulation method for a photovoltaic quasi-Z-source cascade multilevel inverter can independently generate the PWM pulses for a separate cell of ZS/qZS-CMLI with a relatively high efficiency and relatively low harmonics typically by modifying programs, without necessarily substantially increasing hardware complexity. The present method can enhance simplifying hardware implementation in that the present method can enable qZS-CMLI to have additional shoot-through control freedom degree for each qZS-HBI cell, for example. Thus, the present method typically can be implemented with relative ease on a traditional CMLI platform, such as by the addition of the impedance network of a ZS/qZS.

The embodiments of a modular multilevel space vector modulation method for a photovoltaic quasi-Z-source cascade multilevel inverter can therefore provide relatively simple, efficient and modularly extended pulse-width modulation methods and techniques for hardware realization of ZS/qZS-CMLI, for example. Also, in that the present method can be based on a two-level SVM and modularly extended to CMLI, relatively complicated vector judgments and switching time calculations can be substantially eliminated or reduced, for example.

It should be understood by one of ordinary skill in the art that embodiments of the present methods can comprise software or firmware code executing on a computer, a microcontroller, a microprocessor, or a DSP processor; state machines implemented in application specific or programmable logic; or numerous other forms without departing from the spirit and scope of the invention.

A second embodiment of the control and modulation methods for quasi-Z-source cascade multilevel inverters relates to a pulse-width-amplitude modulation method for quasi-Z-source cascade multilevel inverters, which provides variable carrier amplitude for a three-phase voltage source inverter, or so-called pulse-width amplitude modulation (PWAM). A variable modulation signal or carrier is provided, such that the ratio $V_m/V_c$ is variable, thus the term pulse-width-amplitude modulation (PWAM) is used.

One fundamental period of the modulation wave can be divided into six sectors. In each specific sector, only one phase is doing switching, while any of the other two phases remains at a constant state of "0" or "1". With the present PWAM, the inverter not only reduces the equivalent switching frequency but also switches at a much lower voltage and current stresses. The result is that the total switching loss of the inverter can be reduced significantly.

The present PWAM method generates shoot-through states for a qZSI/qZS-CMI with low switching frequency and less power loss, in contrast with the traditional PWM, which compares a carrier, such as the commonly used triangle or sawtooth wave, with a desired modulation signal, such as sinusoidal wave. When the modulation signal is higher than the carrier, a high signal, denoted as "1", will be generated. Inversely, a low signal, denoted as "0", is given. The "1" and "0" are the signals to switch the power devices on and off. In traditional pulse width modulation (PWM), usually the amplitude of the carrier is constant and the carrier frequency is over one kilohertz, much higher than that of the modulation wave, to reduce the distortion of the inverter output voltage and current. The high carrier frequency results in high switching frequency to the power devices, and thus the higher switching losses.

Figure 10:
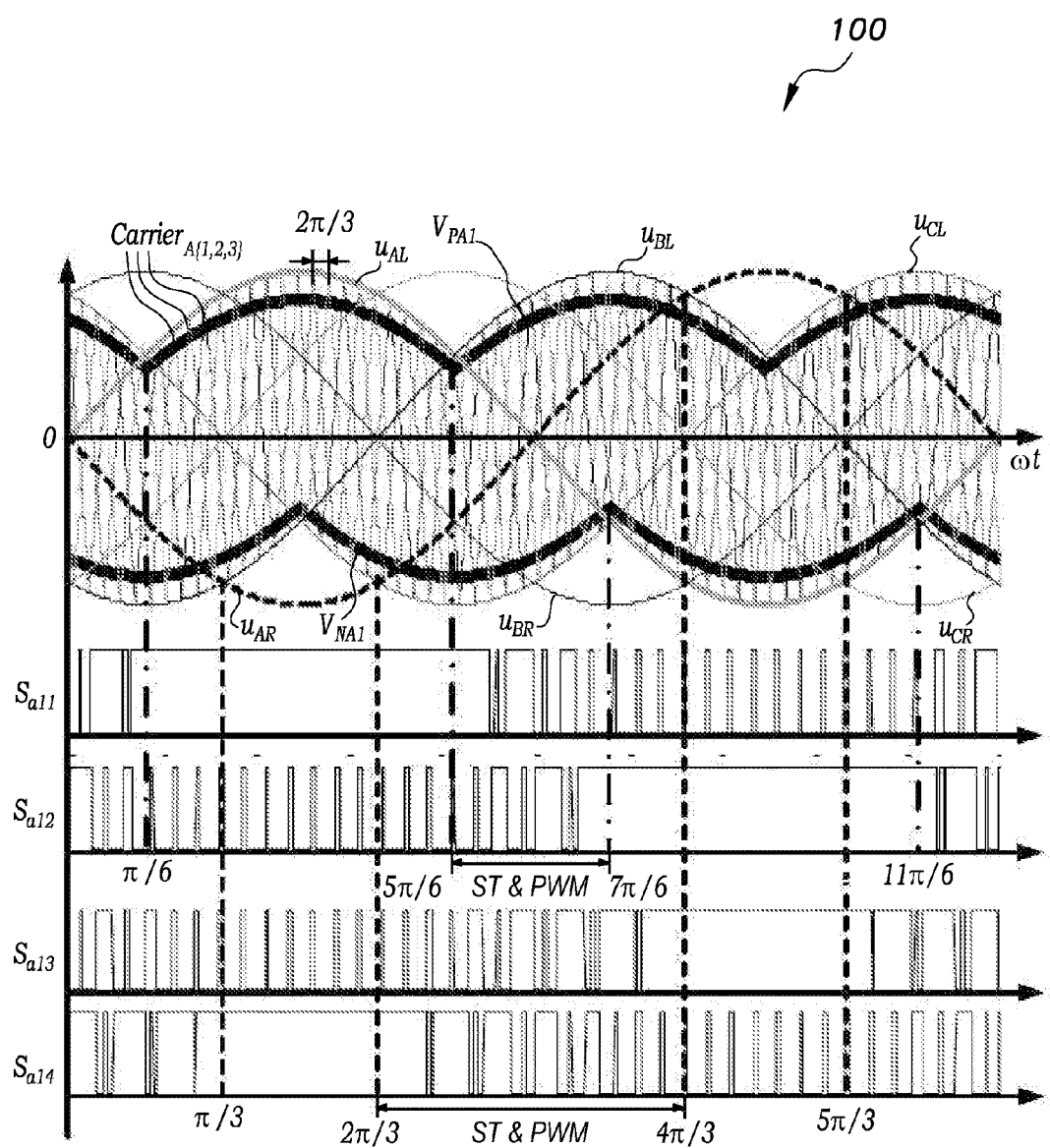
FIG. 10 is a waveform diagram showing timing of the pulse-width-amplitude modulation method for multilevel inverters according to a second embodiment of the present invention.

FIG. 10 shows a waveform diagram 100 of the PWAM for qZS-CMI, using three cascaded modules in the illustration. The present PWAM uses the amplitude-varied carriers for a 7-level qZS-CMI, where $u_{\{A,B,C\}L}$ and $u_{\{A,B,C\}R}$ are the three-phase modulation signals for the left bridge and right bridge legs, respectively. These three-phase modulation signals for the left and right bridges may be characterized by the following:

$$\begin{cases} u_{AL} = \sin(\omega t) \\ u_{BL} = \sin(\omega t - 120°) \\ u_{CL} = \sin(\omega t + 120°) \end{cases}, \begin{cases} u_{AR} = \sin(-\omega t) \\ u_{BR} = \sin(\omega t - 60°) \\ u_{CR} = \sin(\omega t + 60°) \end{cases} \quad (1)$$

where $\omega$ is angular frequency and t is time.

Figure 12:
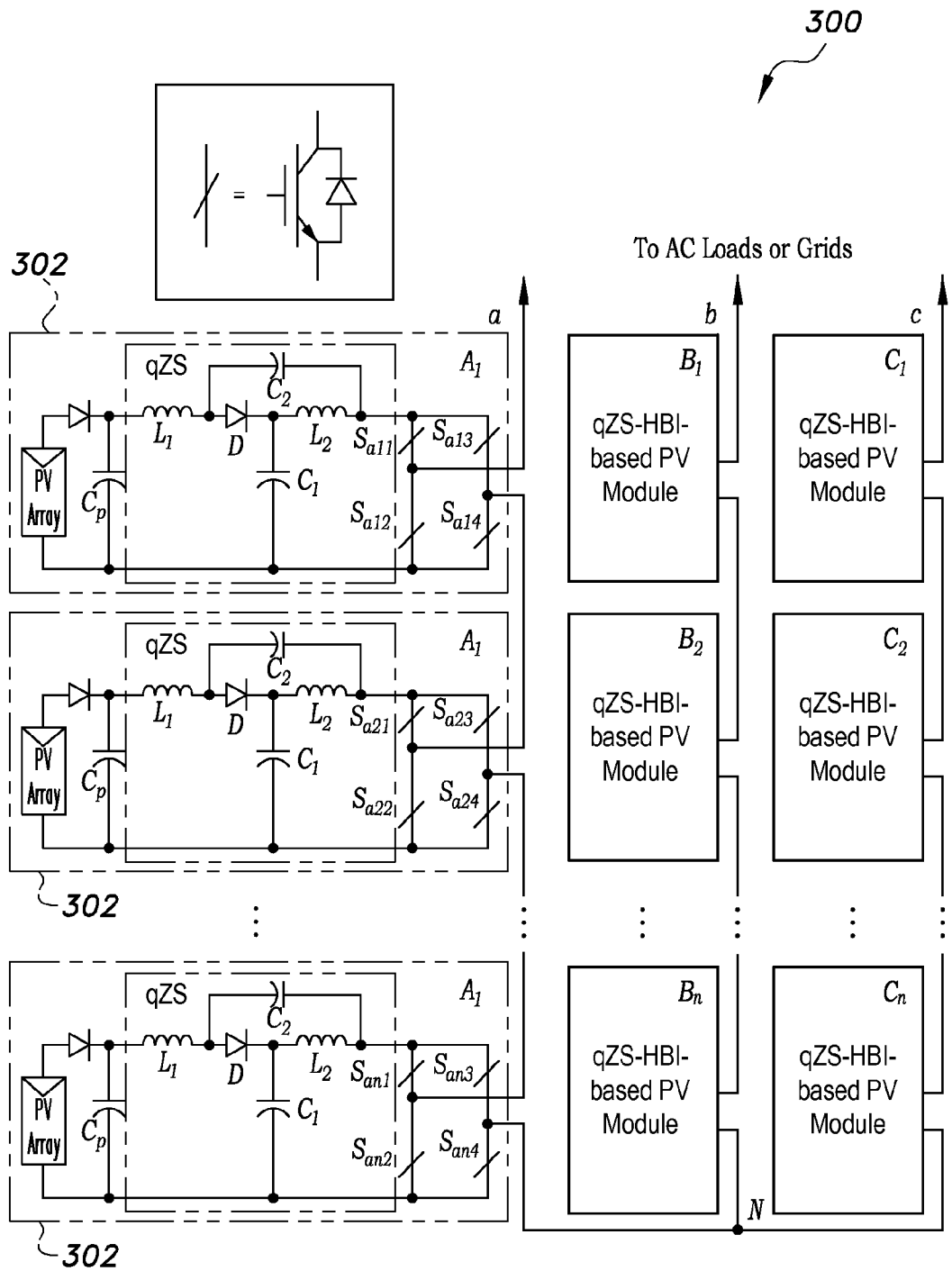
FIG. 12 is a schematic diagram showing the topology of a qZS-CMI PV system used by a pulse-width-amplitude modulation method for multilevel inverters according to the present invention.
Figure 13:
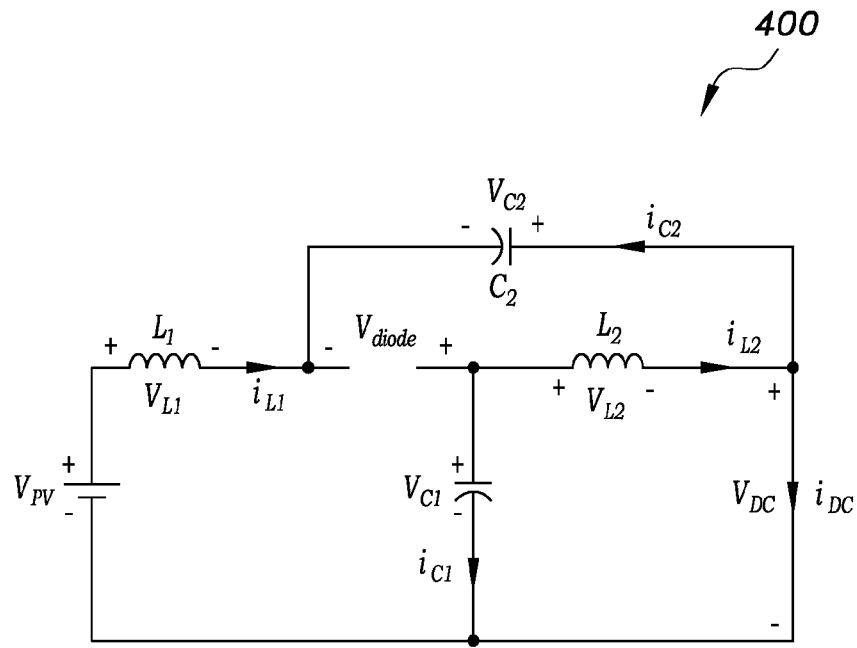
FIG. 13 is a schematic diagram of an equivalent circuit of a single module in a shoot through state in a pulse-width-amplitude modulation method for multilevel inverters according to the present invention.
Figure 14:
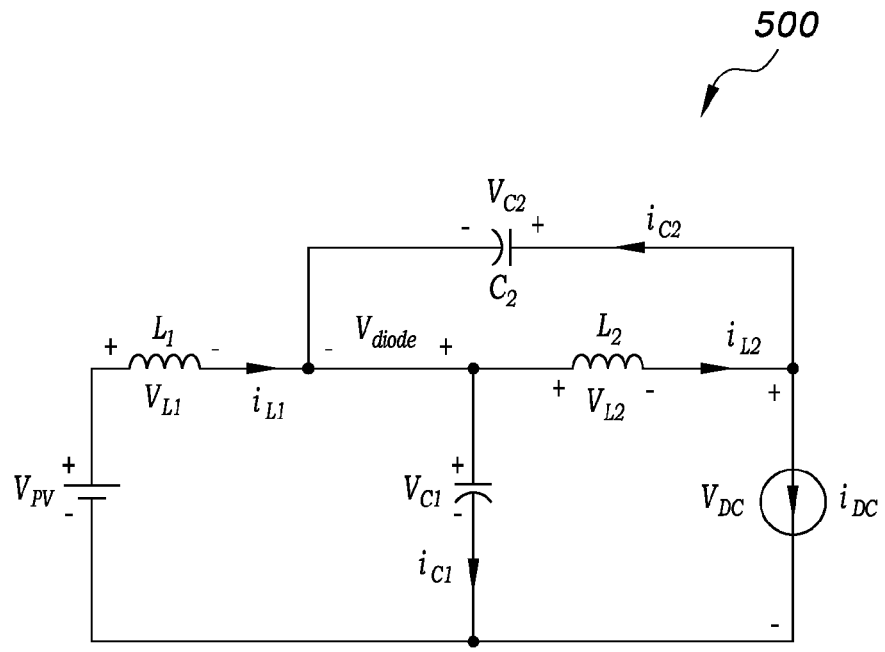
FIG. 14 is a schematic diagram of an equivalent circuit of a single module in a non-shoot through state in a pulse-width-amplitude modulation method for multilevel inverters according to the present invention.

The topology 300 of an exemplary quasi-Z-source cascade multilevel inverter (qZS-CMI) is shown in FIG. 12, where each module 302 is a single-phase quasi-Z-source H-bridge inverter with four power switches, such as $S_{a11}$ to $S_{a14}$ in module $A_1$. Each quasi-Z-source H-bridge inverter (qZS-HBI) module's operating principle is the same as a standard quasi-Z-source inverter; i.e., including shoot-through and non-shoot-through states. When the kth qZS-HBI is in non-shoot-through states, it will work as a traditional HBI. For shoot-through states, the qZS-HBI will not contribute voltage. The qZSI couples an LC impedance network between the DC source and inverter, and the qZS-CMI embeds that impedance network into each H-bridge inverter cell of a cascade multilevel inverter (CMI). FIG. 13 shows the equivalent circuit 400 of one qZS-HBI module in the shoot-through state, wherein each PV array and the qZS capacitors charge the inductors. The diode is cut off due to negative voltage, as shown in FIG. 13. The quantities $v_{L1}$ and $i_{diode}$ are calculated as:

$$v_{L1}=v_{PV}+v_{C2}, v_{L2}=v_{C1}, v_{DC}=0, v_{diode}=v_{C1}+v_{C2},$$
$$i_{diode}=0, i_{C1}=-i_{L2}, i_{C2}=-i_{L1}, i_{DC}=i_{L1}+i_{L2}, \quad (2)$$

in which $v_{PV}$ is the output voltage of each PV array; $v_{DC}$ and $i_{DC}$ are the DC-link voltage and current of one qZS-HBI module, respectively; $V_{dc}$ is the peak dc-link voltage; $v_{diode}$ and $i_{diode}$ are the diode voltage and current; $v_{L1}$, $v_{L2}$, $v_{C1}$, and $v_{C2}$, are voltages of quasi-Z-source inductors and capacitors; $i_{L1}$, $i_{L2}$, $i_{C1}$, and $i_{C2}$ are currents of quasi-Z-source inductors and capacitors; and D is the shoot-through duty ratio. At non-shoot-through states, the PV panel and inductors charge the loads and capacitors, and the diode is in forward conduction, as the equivalent circuit 500 of FIG. 14 shows. In this state:

$$v_{L1}=v_{PV}-v_{C1}, v_{L2}=-v_{C2}, v_{DC}=v_{dc}=v_{C1}+v_{C2}, v_{diode}=0,$$
$$i_{diode}=i_{L1}+i_{L2}-i_{DC}, i_{C1}=i_{L1}-i_{DC}, i_{C2}=i_{L2}-i_{DC}, \quad (3)$$

where $i_{DC}=i_{ac}(t) \cdot d_a(t)$ is the inverter DC-link current, $i_{ac}(t)=I_m \sin \omega t$ is the one-phase grid-injected current, and $d_a(t)=M \sin(\omega t)$ is its duty cycle function. In the meantime, the synthesized voltage of the qZS-CMI per phase is given by:

$$v_H=\Sigma_{k=1}^{n} v_{Hk}=\Sigma_{k=1}^{n} S_k v_{DCk}, \quad (4)$$

where $v_{Hk}$ is the output voltage of the $k^{th}$ qZS-HBI, $S_k$ is the switching function; and n is the number of cascaded modules per phase.

With respect to the waveform diagram shown in FIG. 10, $Carrier_{A(\{1,2,3\})}$ are three carriers for the three modules of phase A, and the carrier amplitudes are the upper and lower envelopes consisting of $u_{AL}$, $u_{BL}$, $u_{CL}$, respectively, and the subscript $A\{1, 2, 3\}$ defines the module. For example, $A_1$ represents module 1 of phase A; $S_{a1\{1,2,3,4\}}$ are the switch patterns of qZS-HBI module $A_1$; $V_{[P, N]A1}$ are the top and bottom shoot-through references for module $A_1$; ST stands for shoot-through action, and PWM stands for active action in the traditional pulse-width modulation. The top and bottom shoot-through references, $V_p$ and $V_n$, are used to generate the shoot-through. When the carrier and modulating wave are higher than $V_p$ or lower than $V_n$, an ON signal "1" will be produced for both the upper and lower switches in one bridge leg, i.e., a shoot-through state. With the constant carrier amplitude, the $V_p$ and $V_n$ are two straight lines in traditional PWM, which has a proportional relation with modulation index M. Thus, the average shoot-through duty ratio in fundamental frequency is (1−M), whereas the carrier amplitude varies between the top and bottom envelopes of the three modulating waves in the PWAM. Therefore, in the present PWAM method, a proportional factor λ is defined, and the top and bottom shoot through references are λ times top and bottom envelopes among the modulation waves, respectively. In this way, a constant shoot-through duty ratio is obtained for the qZSI by simple boost control.

The carrier amplitude of the present PWAM varies between the top and bottom envelopes of the three left bridge legs' modulation waves, i.e.:

$$y_{max}=\max\{u_{AL}, u_{BL}, u_{CL}\}, y_{min}=\min\{u_{AL}, u_{BL}, u_{CL}\}. \quad (5)$$

When implementing the simple boost control, the shoot-through references $V_{PA1}$ and $V_{NA1}$ can be defined as $\lambda y_{max}$ and $\lambda y_{min}$, respectively. Here, λ is a factor which is greater than 0.5 p.u. and less than 1.0 p.u. Thus, the shoot-through duty ratio of PWAM is given by:

$$D = \frac{T_{sh}}{T_s} = \frac{1}{T_s} \int_0^{T_s} \frac{y_{max} - y_{min} - \lambda(y_{max} - y_{min})}{y_{max} - y_{min}} dt = 1 - \lambda. \quad (6)$$

When $\lambda=1$, $V_{PA1}$ and $V_{NA1}$ are equal to $y_{max}$ and $y_{min}$, respectively, and there is no shoot-through action. The PWAM method can be applied to the traditional CMI in this case.

Table 2 below summarizes the switching actions in module $A_1$ for the present PS-PWAM method.

TABLE 2

Switching Actions Of The Present PWAM Method

| Switches | Actions | | |
|---|---|---|---|
| | No switching | ST | ST & PWM |
| $S_{a11}$ | $\pi/6 \sim 5\pi/6$ | $7\pi/6 \sim 11\pi/6$ | $-\pi/6 \sim \pi/6$<br>$5\pi/6 \sim 7\pi/6$ |
| $S_{a12}$ | $7\pi/6 \sim 11\pi/6$ | $\pi/6 \sim 5\pi/6$ | $-\pi/6 \sim \pi/6$<br>$5\pi/6 \sim 7\pi/6$ |
| $S_{a13}$ | $4\pi/3 \sim 5\pi/3$ | $\pi/3 \sim 2\pi/3$ | $-\pi/3 \sim \pi/3$<br>$2\pi/3 \sim 4\pi/3$ |
| $S_{a14}$ | $\pi/3 \sim 2\pi/3$ | $4\pi/3 \sim 5\pi/3$ | $-\pi/3 \sim \pi/3$<br>$2\pi/3 \sim 4\pi/3$ |

The modulation of the present PWAM for qZS-CMI is carried out through: (1) when the modulation wave is the maximum in $U_{\{A,B,C\}L}$, such as UAL in $\pi/6 \sim 5\pi/6$, the upper switch of left-bridge leg, $S_{a11}$, is turned on all the time, without switching action; the bottom switch, $S_{a12}$, will only switch when the carrier is higher than $V_{PA1}$ or lower than $V_{NA1}$. (2) When the modulation wave is the minimum in $U_{\{A,B,C\}L}$, such as UAL in $7\pi/6 \sim 11\pi/6$, the bottom switch of left bridge leg, $S_{a12}$, is turned on all the time, while the upper switch, $S_{a11}$, will only switch when the carrier is higher than $V_{PA1}$ or lower than $V_{NA1}$. (3) The modulation mode of right bridge legs is the same as that of left-bridge legs, while the modulation waves own a $\pi$ phase difference with the related left-bridge legs. (4) A ($2\pi/3$) radian phase difference is employed between adjacent carriers to synthesize a stepped voltage waveform. During the intervals of $5\pi/6$ to $7\pi/6$, 0 to $\pi/6$ and $11\pi/6$ to $12\pi/6$, respectively, both the upper and lower switches act to fulfil the shoot-through state and the active states by comparing the carrier with the shoot-though references and the modulation signals. For the two switches of the right bridge leg, the modulation signal $u_{AR}$ has a 180° phase shift to that of the left bridge leg.

As shown in FIG. 10, from $\pi/3$ to $2\pi/3$, the lower switch $S_{a14}$ of the right bridge leg remains in the "on" state, and the upper switch $S_{a13}$ achieves a shoot-through action by comparison of the carrier and the reference $V_{PA1}$; from $4\pi/3$ to $5\pi/3$, the upper switch $S_{a13}$ of the right bridge leg remains in the "on" state without any switching action, and the lower switch $S_{a14}$ acts as the shoot-through when the carrier is lower than $V_{NA1}$; during 0 to $\pi/3$, $2\pi/3$ to $4\pi/3$ and $5\pi/3$ to $6\pi/3$, respectively, both the upper and lower switches act to fulfil the shoot-through state and the active states, by comparing the carrier with the shoot-though references and the modulation signals.

The three carriers of the three modules in phase A present the $2\pi/3$ phase shift with respect to each other to generate the step-like voltage waveform. To extend the present method to the qZSCMI, a $\pi/n$ radian phase difference is employed between adjacent carriers to synthesize the step-like voltage waveform, where n is the cascaded qZS-HB cells per phase.

Each qZS-HB cell has separate shoot through references, which is produced the same way as the qZSI. Therefore, the dc-link voltage of every qZS-HB cell can be boosted independently, and the dc-link voltages of all the cascaded cells can be kept balanced.

Each layer of the modules has the same carrier, for example, Carrier $A_1$ is the carrier for the modules $A_1, B_1$ and $C_1$. The shoot-through references may be different for all the modules, which depends on the PV panel voltage of each module; $u_{BL}$ and $u_{BR}$ are the modulation signals of the left and right bridge legs in phase B; and $u_{CL}$ and $u_{CR}$ are those for phase C.

Figure 11:
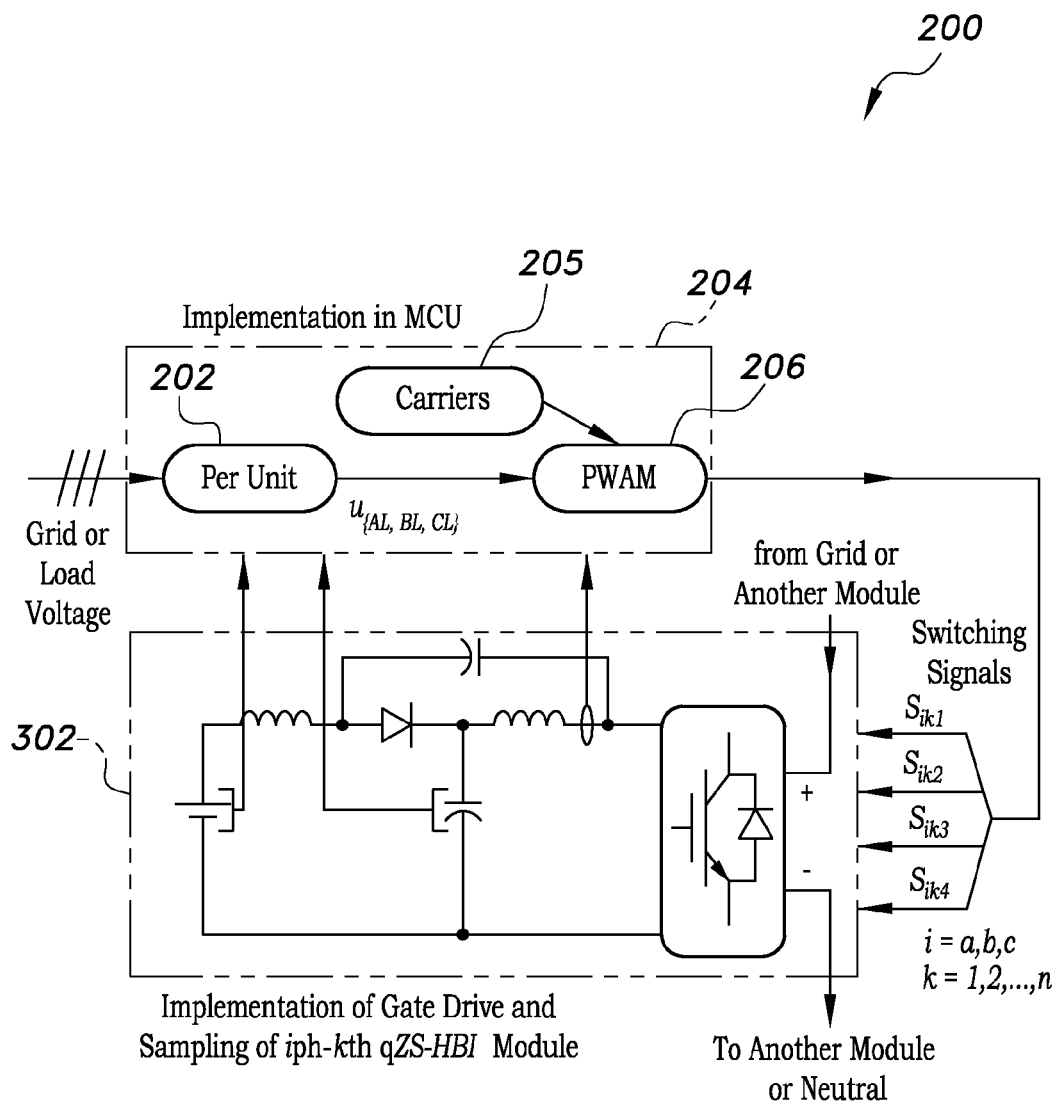
FIG. 11 is a block showing an exemplary processor implementation of the pulse-width-amplitude modulation method for multilevel inverters according to the present invention.

From the operating principle of PWAM detailed in waveform diagram 100 of FIG. 10 and Table 2, it can be seen that in every fundamental period, each left-bridge switch has no switching action within $2\pi/3$ radians; and each right-bridge switch has no switching action within $\pi/3$ radians. In this way, the present PWAM method will greatly reduce the switching loss for the qZS-CMI, particularly when there is no shoot-through state, as the qZS-CMI operates as a traditional CMI. Each left-bridge switch will not have switching action within $4\pi/3$ radians, and each right-bridge switch will have no switching action within $2\pi/3$ radians. As shown in FIG. 11, the present pulse-width-amplitude modulation method may be implemented in a system 200 that utilizes a microcontroller, such as an MCU 204, in operable communication with the grid, the solar array impedance network 302, and the H-bridge switches, the MCU 204 sending switching signals to the H-bridge switches, e.g., to switches $S_{ik1}, S_{ik2}, S_{ik3}, S_{ik4}$. As shown in FIG. 11, MCU 204 inputs grid voltage where a calculation block 202 calculates $u_{\{A,B,C\}L}$ in per unit (p.u) based on the grid or load voltage. The MCU 204 also accepts as input sample data from the solar panel array, the DC link capacitor, and current data from the solar array impedance network 302. Based on the aforementioned input samples, the MCU 204 generates carriers 205 and PWAM switching signals 206, which control the H-bridge switches such as H bridge switch $S_{a11}$, shown in FIG. 12.

The switching signals conform to the pattern shown in waveform diagram 100 of FIG. 10. The MCU 204 is a processor that may include a non-transitory machine-readable medium such as, for example without limitation, embedded flash or RAM memory with error correction. The present method may be provided as a computer program, which includes a non-transitory machine-readable medium having stored thereon instructions that can be used to program a computer, MCU 204, (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Due to the modular structure of a qZS-CMI, its switching loss is analyzed on the basis of one qZS-HBI module. The qZS-HBI includes four insulated-gate bipolar transistor (IGBT) units, one IGBT with its antiparallel diode per unit; and each IGBT unit may operate in active states and shoot-through states. The switching loss is evaluated in the two states accordingly.

In traditional active states, the switched voltage of power device is the dc-link peak voltage. The switched current is the AC load current. The switching loss per IGBT unit is given by:

$$P_{SW,ACT} = \frac{1}{2\pi}\int_0^\pi f_s(E_{ON} + E_{OFF} + E_{REC})\frac{V_{dc}i_{ac}}{V_{ref}I_{ref}}d\omega t \quad (7)$$

$$= \frac{1}{2\pi}\int_0^\pi P_{F,ACT}i_{ac}d\omega t$$

$$P_{F,ACT} = f_s(E_{ON} + E_{OFF} + E_{REC})\frac{V_{dc}}{V_{ref}I_{ref}}.$$

$P_{F,ACT}$ is defined as the switching loss factor of the active state; $f_s$ is the switching frequency; $E_{ON}$ and $E_{OFF}$ are the turn-on and turn-off switching loss energy per pulse of each IGBT, respectively; $E_{REC}$ is the reverse recovery loss of an anti-parallel diode; $V_{ref}$ and $I_{ref}$ are the switching voltage and current references; $V_{dc}$ is the switched dc-link peak voltage, and $i_{ac}$ is the AC load current.

At shoot-through states, the upper and lower switches of one bridge leg turn on at the same time. The switching loss per IGBT is:

$$P_{SW,ST} = \frac{1}{2\pi}\int_0^\pi f_s(E_{ON} + E_{OFF})\frac{V_{dc}i_{SW,ST}}{V_{ref}I_{ref}}d\omega t \quad (8)$$

$$= \frac{1}{2\pi}\int_0^\pi P_{F,ST}i_{SW,ST}d\omega t$$

$$P_{F,ST} = f_s(E_{ON} + E_{OFF})\frac{V_{dc}}{V_{ref}I_{ref}},$$

in which $i_{SW,ST}=i_L+(I_m/2)\sin(\omega t)$ is the current through the switch the in shoot-through state, and $P_{F,ST}$ is defined as the switching loss factor of the shoot-through state. The power devices' switching loss per qZS-HBI is then given as:

$$P_{SW}=4(P_{SW,ACT}+P_{SW,ST}). \quad (9)$$

It is known that in the SPWM method, each IGBT unit alternates between shoot-through and active modulation during the half fundamental period. Therefore, from equation (6), the switching loss for SPWM in active states is:

$$P_{SW,ACT}^{SPWM} = \frac{P_{F,ACT}I_m}{2\pi}\int_0^\pi \sin(\omega t)d\omega t = \frac{I_m}{\pi}P_{F,ACT}. \quad (10)$$

The shoot-through action occurs during the entire fundamental period. Thus, from equation (7), the switching loss per IGBT unit in this state becomes:

$$P_{SW,ST}^{SPWM} = \frac{P_{F,ST}}{2\pi}\int_0^{2\pi}\left[i_L + \frac{I_m}{2}\sin(\omega t)\right]d\omega t = P_{F,ST}I_L. \quad (11)$$

In the PWAM technique, each IGBT unit only switches for active action and shoot-through action in part of the fundamental period. In addition, the intervals are different for left and right legs. From FIG. 10 and Table 2, for one left bridge switch, the switching loss caused by PWAM in active states is:

$$P_{SWL,ACT}^{PWAM} = \frac{P_{F,ACT}I_m}{2\pi}\left[\int_0^{\pi/6}\sin(\omega t)d\omega t + \int_{5\pi/6}^\pi \sin(\omega t)d\omega t\right] \quad (12)$$

$$= \frac{2-\sqrt{3}}{2\pi}P_{F,ACT}I_m.$$

Thus, $$P_{SW,ST}^{PWAM} = \left(\frac{2-\sqrt{3}}{2\pi}\bigg/\frac{1}{\pi}\right)P_{SW,ACT}^{SPWM} \approx 13.4\% P_{SW,ACT}^{SPWM}, \quad (13)$$

which shows an 86.6% switching loss reduction for each left bridge switch.

Accordingly, the switching loss for one right-bridge switch in the active state is:

$$P_{SWR,ACT}^{PWAM} = \frac{P_{F,ACT}I_m}{2\pi}\left[\int_0^{\pi/3}\sin(\omega t)d\omega t + \int_{2\pi/3}^\pi \sin(\omega t)d\omega t\right] \quad (14)$$

$$= \frac{1}{2\pi}P_{F,ACT}I_m = 50\% P_{SW,ACT}^{SPWM}$$

which is a 50% switching loss reduction.

In shoot-through states, the switched current for the left bridge leg is the same as for the SPWM; i.e., $(i_L+i_{ac}/2)$, while that for the right-bridge switch is $(i_L-i_{ac}/2)$. Therefore, the switching losses for left/right-bridge switches are:

$$P_{SWL,ST}^{PWAM} = \frac{P_{F,ST}}{2\pi}\left[\int_0^{\pi/6}\left(i_L + \frac{i_{ac}}{2}\right)d\omega t + \int_{5\pi/6}^{2\pi}\left(i_L + \frac{i_{ac}}{2}\right)d\omega t\right] \quad (15)$$

$$= P_{F,ST}\left(\frac{2}{3}I_L - \frac{\sqrt{3}}{4\pi}I_m\right),$$

and $$P_{SWR,ST}^{PWAM} = \frac{P_{F,ST}}{2\pi}\left[\int_0^{4\pi/3}\left(i_L - \frac{i_{ac}}{2}\right)d\omega t + \int_{5\pi/3}^{2\pi}\left(i_L - \frac{i_{ac}}{2}\right)d\omega t\right] \quad (16)$$

$$= P_{F,ST}\left(\frac{5}{6}I_L - \frac{1}{4\pi}I_m\right).$$

Comparing equations (15) and (16) with equation (10), it can be seen that each left-bridge switch presents more than one-third switching loss reduction compared to the SPWM, and that of the right-bridge leg is more than one-sixth loss reduction during the shoot-through states, when compared with the SPWM. Totally, the present PWAM will contribute to a more than 25% switching loss reduction in the shoot-through states.

Thus, the switching loss of one qZS-HBI module in the PWAM is two times the loss of one left and one right bridge legs, including active and shoot-through states; i.e., $$P_{SW}^{PWAM}=2(P_{SWL,ST}^{PWAM}+P_{SWR,ST}^{PWAM}+P_{SWL,ACT}^{PWAM}+P_{SWR,ACT}^{PWAM}). \quad (17)$$

Table 3 illustrates system specifications for an exemplary module for testing the present method. Its parameters for energy loss are: $E_{ON}=0.75$ mJ per pulse, $E_{OFF}=0.83$ mJ per pulse, and $E_{REC}=0.4$ mJ per pulse at $V_{ref}=300$ V, $I_{ref}=30$ A.

TABLE 3

| System Specifications | |
| --- | --- |
| Parameters | Values |
| Rated power of qZS-HBI based PV module, $P_{ref}$ | 1 kW |
| PV panel voltage range, $V_{PV}$ | 60~120 V |
| Required de-link peak voltage, $V_{dc}$ | 136 V |

TABLE 3-continued

System Specifications

| Parameters | Values |
| --- | --- |
| quasi-Z-source inductance, $L_1$ and $L_2$ | 1800 µH |
| quasi-Z-source capacitance, $C_1$ and $C_2$ | 3300 µF |
| Filter inductance, $L_f$ | 3 mH |
| Filter capacitance, $C_f$ | 10 µF |

The present PWAM method demonstrates a more than 50% total switching loss reduction compared to the SPWM. A 3-phase 7-level qZS-CMI based PV power generation system was simulated in MATLAB/Simulink. Identical 90 V PV panel voltage of all qZS-HBI modules and stand-alone mode with 20-Ω resistance per phase were simulated for verifying the present PWAM method.

The present PWAM method was implemented on a 7-level qZS-CMI setup with the same parameters shown in Table 3. Each left-bridge leg switch had no switching action within one-third fundamental period, and the right-bridge leg switch had no switching within 1/6 fundamental period. Results from a hardware implementation were in accordance with the theoretical analysis and simulated results.

With respect to a comparison of the efficiency of the qZS-CMI in the PSPWAM vs. PS-SPWM, it was found that with a different shoot through duty ratio, the qZS-CMI has almost 1% efficiency improvement in the present PWAM compared with that in the SPWM.

Figures 15A, 15B, 15C:
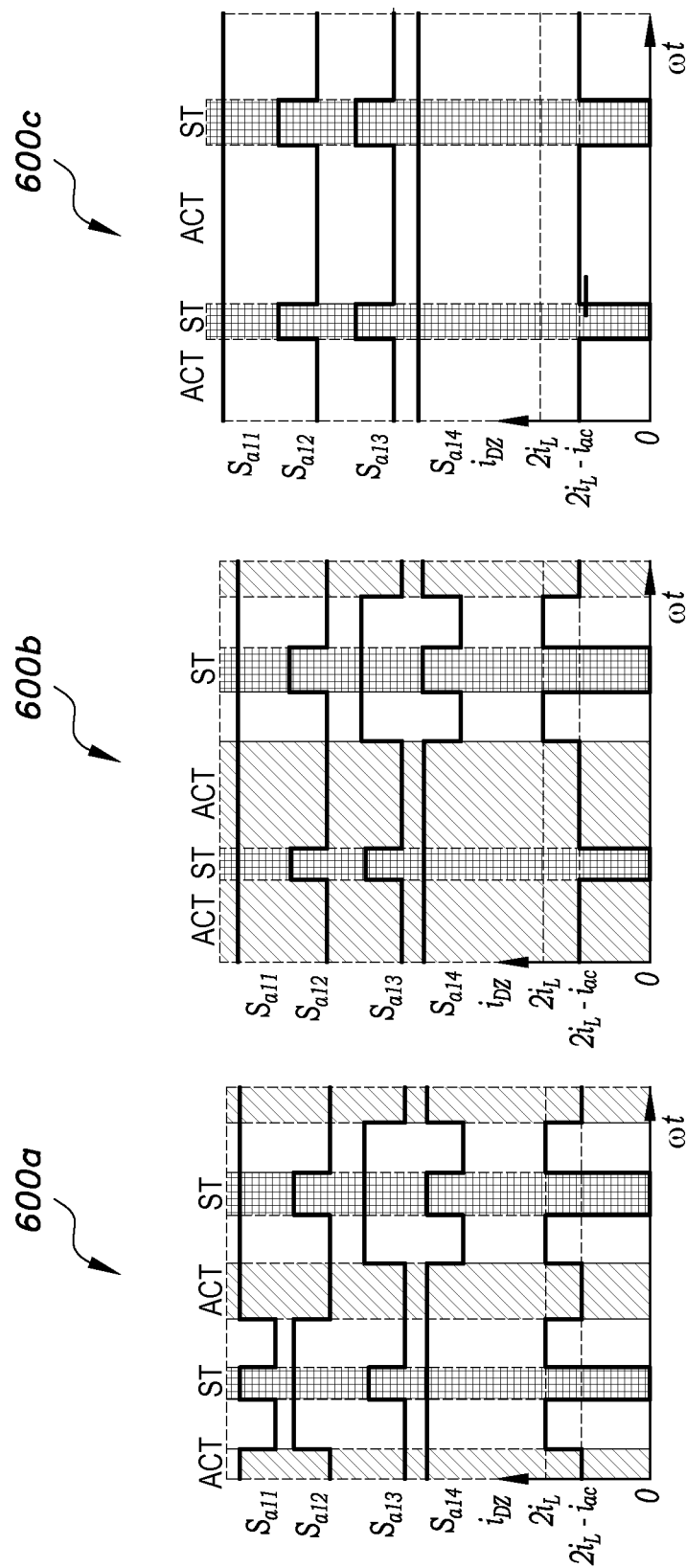
FIG. 15A is a waveform diagram showing qZS diode current during a first angular displacement of the phase cycle in a pulse-width-amplitude modulation method for multilevel inverters according to the present invention.
FIG. 15B is a waveform diagram showing qZS diode current during a second angular displacement of the phase cycle in a pulse-width-amplitude modulation method for multilevel inverters according to the present invention.
FIG. 15C is a waveform diagram showing qZS diode current during a third angular displacement of the phase cycle in a pulse-width-amplitude modulation method for multilevel inverters according to the present invention.
Figure 15D:
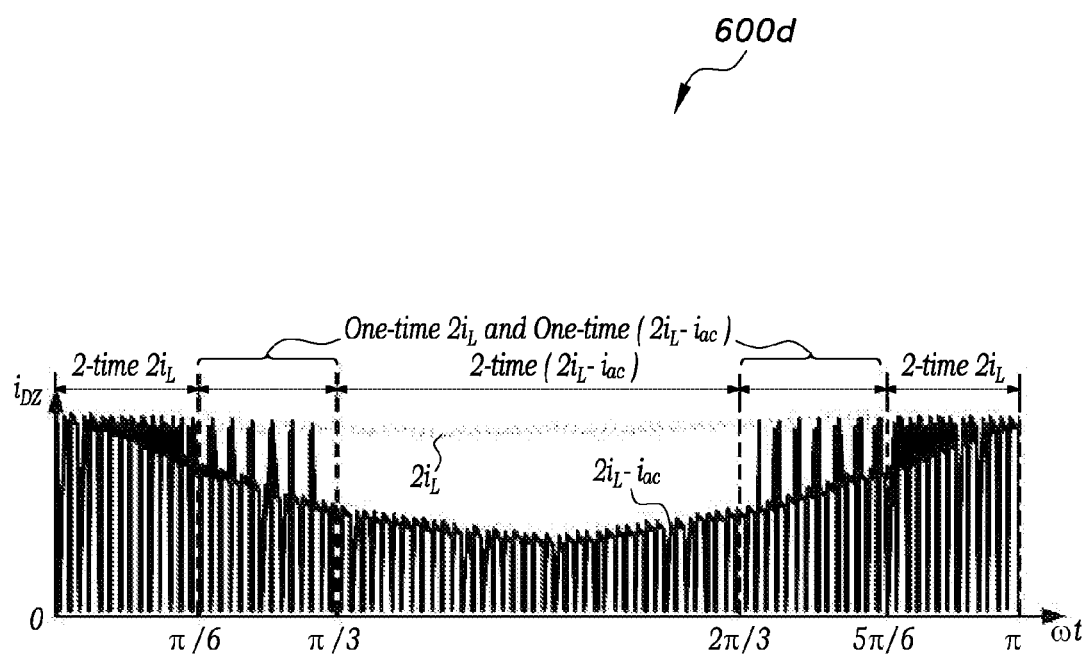
FIG. 15D is a plot showing qZS diode current between 0 degrees and 180 degrees of the phase cycle in a pulse-width-amplitude modulation method for multilevel inverters according to the present invention.

FIGS. 15A through 15D show the typical current flowing through the qZS diode during operational phases of the present PWAM. There are three cases shown in FIGS. 15A through 15D, when all the four switches are performing ST and PWM action during 0 to π/6 and 5π/6 to π, respectively. In FIGS. 15A and 15D, the qZS diode switches two times at a current of $2i_L$.

When one switch is not switching during π/6 to π/3 and 2π/3 to 5π/6, respectively, as FIGS. 15B and 15D show, there is a one-time switching at $(2i_L - i_{ac})$ and another one-time switching at $2i_L$. When two switches are not switching during π/3 to 2π/3, respectively, as shown in FIGS. 15C and 15D, the diode switches at $(2i_L - i_{ac})$ twice. This procedure is repeated for every π radians. Thus, the switching loss for the qZS diode is characterized by the relation:

$$P_{DZ,SW}^{PWAM} = \frac{P_{F,DZ}}{\pi} \int_0^\pi k_{DSW} i_{DSW}^{PWAM}(t) d\omega t \quad (18)$$

$$= 2P_{F,DZ}\left(2I_L - \frac{1}{\pi}I_m\right),$$

where $k_{DSW} i_{DSW}^{PWAM}(t)$ is a piecewise function from FIG. 15D and $P_{F,DZ}$ is defined as the switching loss factor of the qZS diode. In the active states, the duty cycle functions for the left-bridge leg's IGBT and diode can be described by:

$$d_{TL}(t) = \begin{cases} \frac{1 + (u_{AL}/(u_{CL} - u_{BL}))}{2} - \frac{D}{2} & \omega t \in \left[0, \frac{\pi}{6}\right] \\ 1 - D & \omega t \in \left[\frac{\pi}{6}, \frac{5\pi}{6}\right] \\ \frac{1 + (u_{AL}/(u_{BL} - u_{CL}))}{2} - \frac{D}{2} & \omega t \in \left[\frac{5\pi}{6}, \pi\right] \end{cases} \quad (19)$$

$$d_{DL}(t) = 1 - d_{TL}(t) - D.$$

Similarly, the duty cycle functions for the right-bridge leg's IGBT and diode can be written as:

$$d_{TR}(t) = \begin{cases} \frac{1 + (u_{AR}/(u_{BL} - u_{CL}))}{2} - \frac{D}{2} & \omega t \in \left[\pi, \frac{7\pi}{6}\right] \\ \frac{1 + (u_{AR}/(u_{BL} - u_{AL}))}{2} - \frac{D}{2} & \omega t \in \left[\frac{7\pi}{6}, \frac{4\pi}{3}\right] \\ 1 - D & \omega t \in \left[\frac{4\pi}{3}, \frac{5\pi}{3}\right] \\ \frac{1 + (u_{AR}/(u_{CL} - u_{AL}))}{2} - \frac{D}{2} & \omega t \in \left[\frac{5\pi}{3}, \frac{11\pi}{6}\right] \\ \frac{1 + (u_{AR}/(u_{CL} - u_{BL}))}{2} - \frac{D}{2} & \omega t \in \left[\frac{11\pi}{6}, 2\pi\right] \end{cases} \quad (20)$$

$$d_{DR}(t) = 1 - d_{TL}(t) - D.$$

The left and right bridge IGBT's average and RMS currents and those for the diode in the active states can be calculated using H-bridge switch conduction loss equations:

$$I_{ACT,AVE} = \frac{1}{2\pi} \int_0^\pi i_{ac} d(t) d\omega t, \quad (21)$$

$$I_{ACT,RMS}^2 = \frac{1}{2\pi} \int_0^\pi i_{ac}^2 d(t) d\omega t,$$

in conjunction with equations (19) and (20), where d(t) is the duty cycle function.

For conduction loss computation in the shoot-through state, use the fact that the average and RMS currents in the shoot-through states are:

$$I_{ST,AVE} = \frac{1}{2\pi} \int_0^{2\pi} \left(i_L + \frac{i_{ac}}{2}\right) D d\omega t = I_L D, \quad (22)$$

$$I_{ST,RMS}^2 = \frac{1}{2\pi} \int_0^{2\pi} \left(i_L + \frac{i_{ac}}{2}\right)^2 D d\omega t = \left(I_L^2 + \frac{I_m^2}{8}\right) D,$$

and those for the left and right bridge legs in the present PS-PWAM method can be calculated by:

$$I_{STL,AVE} = \frac{1}{2\pi} \int_0^{2\pi} \left(i_L + \frac{i_{ac}}{2}\right) D d\omega t = I_L D, \quad (23)$$

$$I_{STL,RMS}^2 = \frac{1}{2\pi} \int_0^{2\pi} \left(i_L + \frac{i_{ac}}{2}\right)^2 D d\omega t = \left(I_L^2 + \frac{I_m^2}{8}\right) D$$

and

-continued $$I_{STR,AVE} = \frac{1}{2\pi}\int_0^{2\pi}\left(i_L - \frac{i_{ac}}{2}\right)Dd\omega t = I_L D, \quad (24)$$

$$I_{STR,RMS}^2 = \frac{1}{2\pi}\int_0^{2\pi}\left(i_L - \frac{i_{ac}}{2}\right)^2 Dd\omega t = \left(I_L^2 + \frac{I_m^2}{8}\right)D,$$

then using:

$$P_{CON} = I_{AVE}V_{ON} + I_{RMS}^2 R_{ON} \quad (25)$$

and $$d_T(t) = \frac{1+M\sin(\omega t)}{2} - \frac{D}{2}, \; d_D(t) = \frac{1-M\sin(\omega t)}{2} - \frac{D}{2}, \quad (26)$$

in conjunction with (1), (19) through (21) and (22) through (24), the conduction losses of the PS-SPWM and the PWAM can be calculated, respectively.

Regarding power loss of the qZS diode, the shoot-through action of the H-bridge switches will lead to the qZS diode being turned off. Otherwise, the diode turns on, which causes a loss. For both the PS-SPWM and PWAM, there are two times of shoot-through per control cycle. From equations (2) and (3), the qZS diode blocks the dc-link peak voltage $V_{dc}$, but the diode current depends on the operating status of the H-bridge switches. Returning to the diode switching plots 600a through 600d of FIGS. 15A through 15D, respectively, $k_{DSW}i_{DSW}^{PWAM}(t)$, the piecewise function from FIG. 15D and $P_{F,DZ}$ is further characterized by the relation:

$$k_{DSW}i_{DSW}^{PWAM}(t) = \begin{cases} 2 \cdot 2i_L & \omega t \in \left[0, \frac{\pi}{6}\right] \cup \left[\frac{5\pi}{6}, \pi\right] \\ 2i_L + (2i_L - i_{ac}) & \omega t \in \left[\frac{\pi}{6}, \frac{\pi}{3}\right] \cup \left[\frac{2\pi}{3}, \frac{5\pi}{6}\right] \\ 2(2i_L - i_{ac}) & \omega t \in \left[\frac{\pi}{3}, \frac{2\pi}{3}\right] \end{cases} \quad (27)$$

Using equations (19) and (20) for active vectors and traditional zero vectors of the PWAM, the duty cycles of the diode may be characterized as:

$$d_{DZ,ACT}^{PWAM}(t) = \begin{cases} \frac{\tan\omega t}{\sqrt{3}} & \omega t \in \left[0, \frac{\pi}{6}\right] \\ \frac{1+\left(\sin\omega t/\left(\sqrt{3}\sin(\omega t+30°)\right)\right)}{2} & \omega t \in \left[\frac{\pi}{6}, \frac{\pi}{3}\right] \\ 1-D & \omega t \in \left[\frac{\pi}{3}, \frac{2\pi}{3}\right] \\ \frac{1-\left(\sin\omega t/\left(\sqrt{3}\sin(\omega t+30°)\right)\right)}{2} & \omega t \in \left[\frac{2\pi}{3}, \frac{5\pi}{6}\right] \\ -\frac{\tan\omega t}{\sqrt{3}} & \omega t \in \left[\frac{5\pi}{6}, \pi\right] \end{cases} \quad (28)$$

$$d_{DZ,ZERO}^{PWAM}(t) = 1 - d_{DZ,ACT}^{PWAM}(t) - D.$$

With respect to harmonic distortion, under operating conditions where the PV voltage is 90 V, the shoot-through duty ratio is 0.169 to achieve 136 V dc-link peak voltage per qZS-HBI module, the switching frequency $f_s$ is 5 kHz, and the RL-type phase load includes a 20Ω resistor and a 10 mH inductor, the harmonic components of the qZS-CMI's phase voltage in the PS-PWAM are mainly at $k_{fs}$ (k=1, 2, 3, . . . ) with a narrow frequency range.

A third embodiment of the modulation methods for quasi-Z-source cascade multilevel inverters relates to a grid-connected control method for quasi-Z-source cascade multilevel inverter-based photovoltaic power generation for extracting maximum power from each Z-source cascade multilevel inverter. The grid-connected control method for quasi-Z-source cascade multilevel inverter-based photovoltaic power generation embeds the quasi-Z-source impedance network between the DC source and the inverter for each H-bridge module of the traditional cascade multilevel inverter (CMI). In this way, it provides the merits of both the traditional CMI and the quasi-Z-source inverter (qZSI), such as high-quality step-like output voltage waveforms with lower harmonic distortions, lower requirement of power semiconductors, modular topology, and most important of all, independent DC-link voltage boost through the single-stage power conversion of the quasi-Z-source network.

The method includes closed-loop shoot-through duty ratio control, which compensates the PV panel voltage of each H-bridge module independently and injects power into the grid with low current harmonics and unity power factor (duty ratio being the time when the signal is ON divided by the total of the time when the signal is ON plus the time when the signal is OFF). Each quasi-Z-source H-bridge inverter module contains a shoot-through state and a non-shoot-through state, which is inherited from the qZSI. During the shoot-through state, at least one of the bridge legs conducts.

The shoot-through duty ratio is provided to represent the average shoot-through time interval in one switch period. By regulation of the shoot-through duty ratio, the DC source voltage can buck or boost to a desired value.

The method works in a single-phase system. Moreover, as shown in the system 700 of FIG. 16, a total PV voltage loop 708 is contained by adjusting a voltage summation 704 provided by n PV arrays, e.g., PV arrays 702a, 702b, through 702c, to track the sum of n reference values by a proportional-integral (PI) regulator, in which n is the number of cascaded modules. Additionally, nA separate PI loops control the other PV panels, tracking their own maximum power point, while one grid-connected current feedback loop represents the control of grid-tie power because the grid voltage is invariable. A phase lock loop (PLL) 706 synchronizes grid voltage input $v_g$ of the PI controller for each of the modular voltage loops 710 through 712. The outputs of separate PV voltage loops are used to produce modulation signals $v_{m2}$ to $v_{mn}$ for the (n−1) H-bridge modules. At the same time, the output of the total PV voltage loop generates the reference value of inner grid-tie current loop 714, which is compared with the measured real-time grid-connected current.

Figure 16:
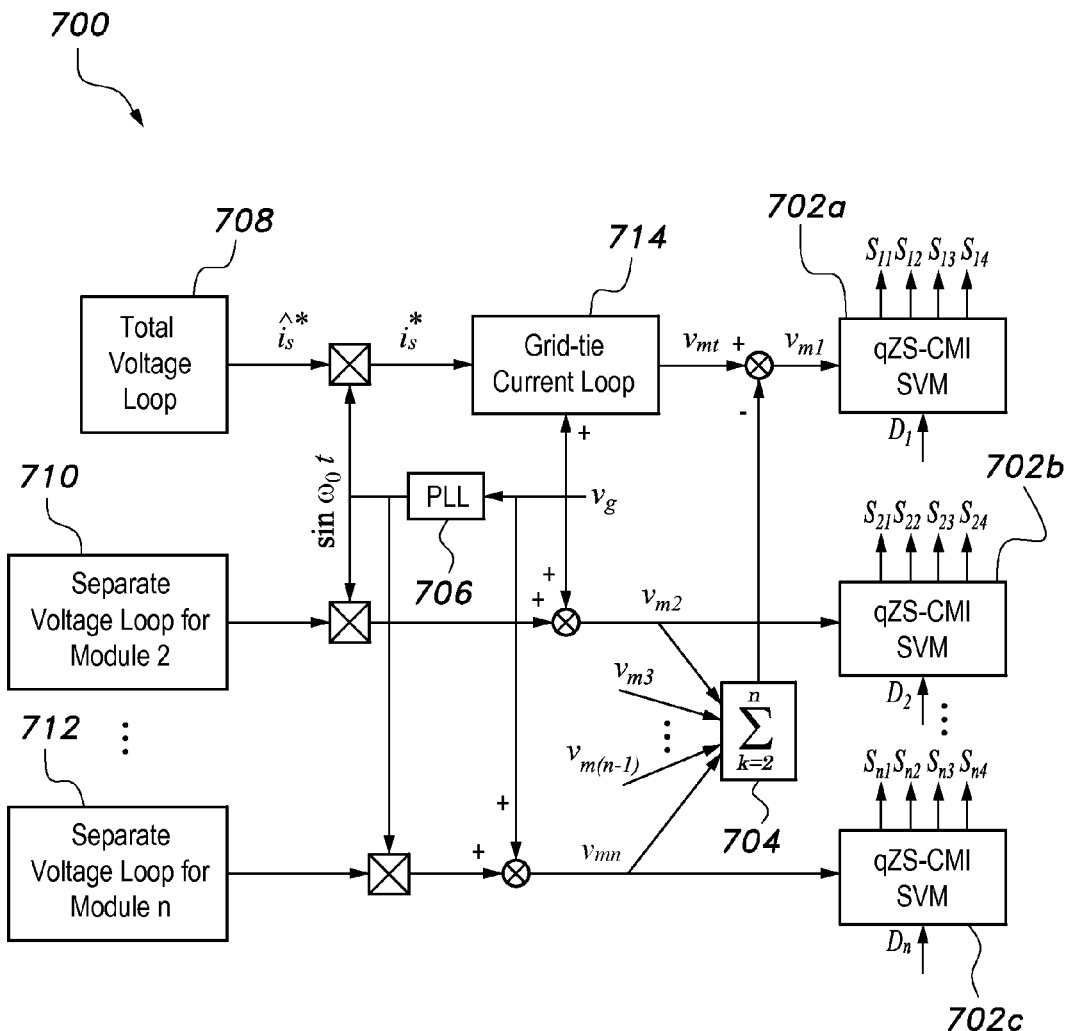
FIG. 16 is a block diagram showing a control system for a qZS-CMI-based grid-tie PV power generation system implementing a grid-connected control method for quasi-Z-source (qZS) cascade multilevel inverter-based (CMI-based) photovoltaic (PV) power generation according to a third embodiment of the present invention.

Then, through a Proportional+Resonant (PR) regulator, which is suitable to track sinusoidal references, the error provides the modulation signal to the power switches, denoted as $v_{mt}$. It is noted that the $v_{mt}$ comes from the total PV voltage loop. Thus, it is a sum of modulation signals for all the n cascaded modules. Therefore, the present method subtracts the modulation signals generated by the (n−1) separate PV voltage loops from the $v_{mt}$ to get the modulation signal for the first H-bridge module, as the control blocks of FIG. 16 show.

Figure 17:
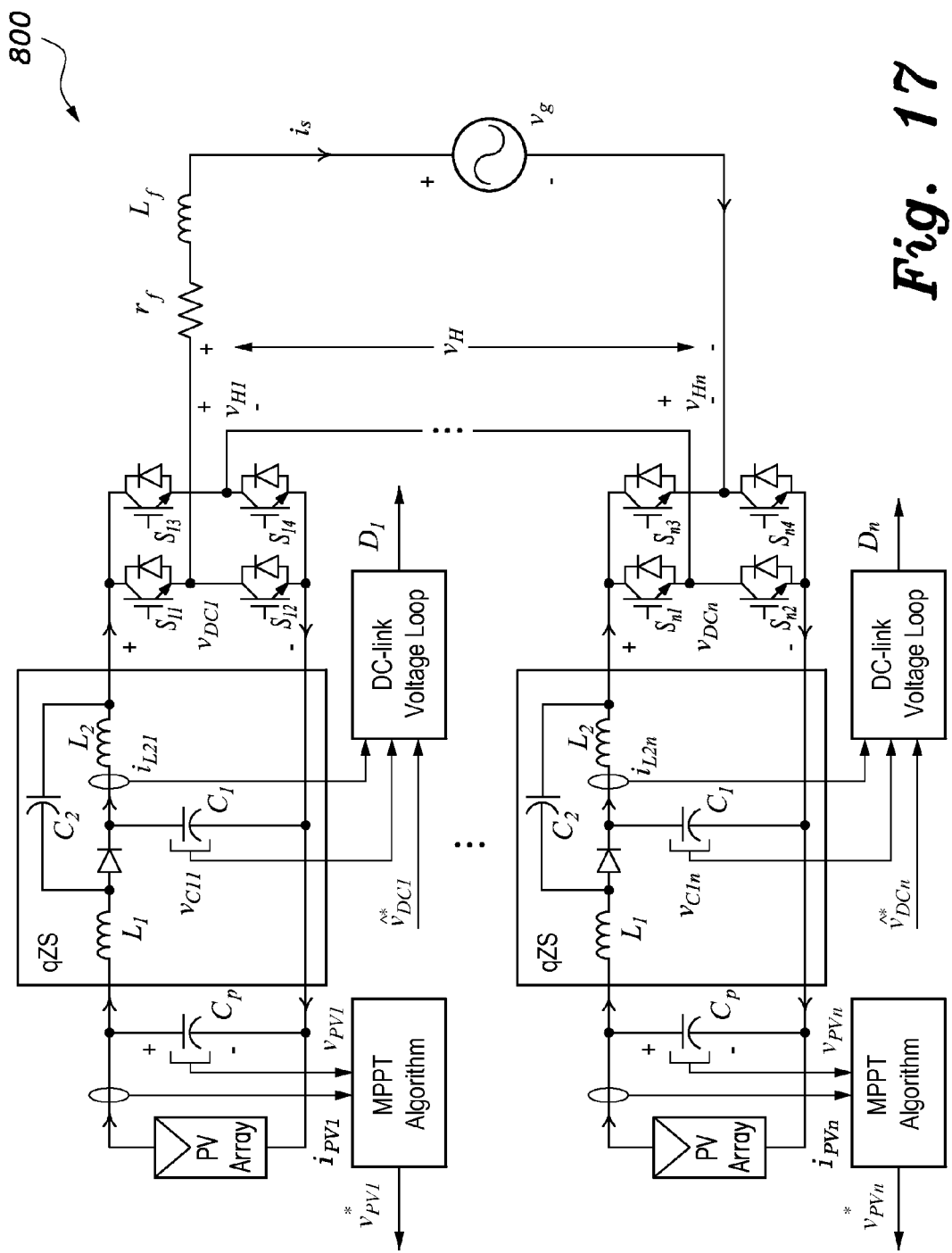
FIG. 17 is a schematic diagram showing the individual control loops for the PV modules in a qZS-CMI control system implementing a grid-connected control method for quasi-Z-source (qZS) cascade multilevel inverter-based (CMI-based) photovoltaic (PV) power generation according to the third embodiment of the present invention.

Next, the present control method uses the n modulation signals and n shoot-through duty ratios to produce proper switching signals by space vector modulation (SVM) to control the on-off states of the power switches. In this way, the DC-link voltage is adjusted independently, while the PV panel power tracks the maximum power point for each module, (shown in the detail circuit 800 of FIG. 17), as the grid-tie power is injected with unity power factor. The present grid-connected control system addresses control of single-phase qZS-CMI based PV power generation systems. Moreover, the present control method provides low harmonics due to the synthesis of output voltages from the cascaded modules.

The maximum power point tracking (MPPT) for separate PV panels and balanced DC-link voltages among cascaded modules are important issues for qZS-CMI-based Photovoltaic power systems. The present control method, thus, allows for full use of PV power by the distributed MPPT from separate PV panels, balances the DC-link peak voltage among cascaded modules by the independent closed-loop control of DC-link peak voltage, and injects the power into grid with low harmonics and unity power factor, thereby creating a simple, efficient and reliable grid-tie procedure for implementing the qZS-CMI-based grid-tie PV system.

The SVM for each qZS-HBI is achieved by modifying the SVM technique for the traditional single-phase inverter. Using the first qZS-HBI (a quasi-Z-source inverter coupled to the grid by an H-bridge) module shown in the detail circuit diagram 800 of FIG. 17 as an example, the voltage vector reference $U_{ref1}$ is created through the two vectors $U_1$ and $U_0$, by:

$$U_{ref1} = U_1 \frac{T_1}{T_s} + U_0 \frac{T_0}{T_s}, \tag{29}$$

where $T_s=1/f_c$ and $f_c$ is the carrier frequency; the time interval $T_1$ is the duration of active vectors, and the $T_0$ is the duration of traditional zero voltage space vectors. Thus, the switching times for the left and right bridge legs in the traditional HBI are $\{t_L, t_R\} \in \{T_0/4, T_0+T_1/2\}$. However, the shoot-through states are required for the independent qZS-HBI modules.

Figure 18:
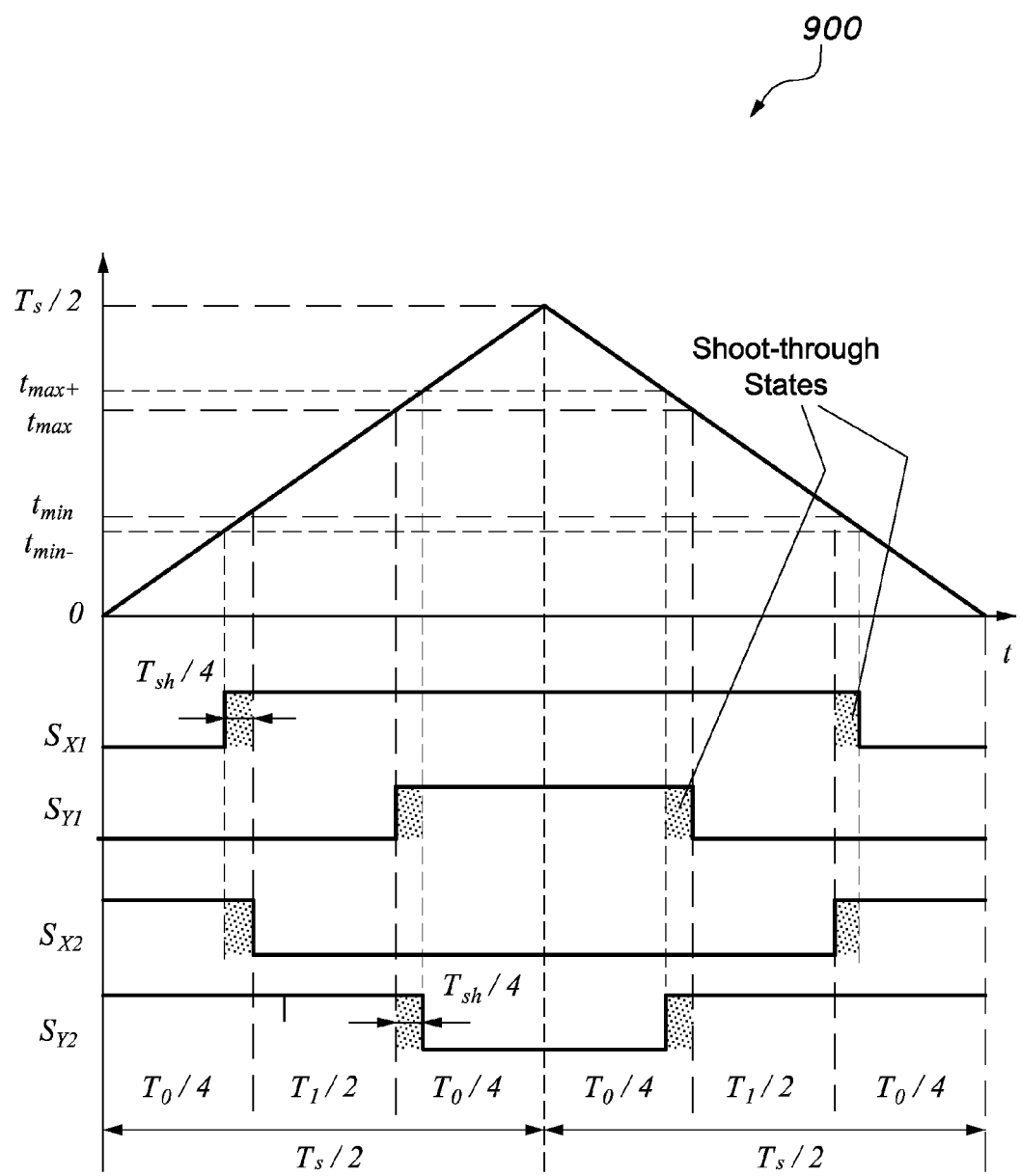
FIG. 18 is a chart showing the switching pattern of a single qZS-HBI (quasi-Z-source H-bridge inverter) module implementing a grid-connected control method for quasi-Z-source (qZS) cascade multilevel inverter-based (CMI-based) photovoltaic (PV) power generation according to the third embodiment of the present invention.

For this purpose, a delay of the switching times for upper switches or a lead of the switching times for lower switches is employed at the transition moments, as chart 900 of FIG. 18 shows. During each control cycle, the total time $T_{sh}$ of shoot-through zero state is equally divided into four parts. The time intervals of $t_{min} \in \min\{t_L, t_R\}$ and $t_{max} \in \max\{t_L, t_R\}$ remain unchanged; $t_{min-}=(t_{min}-T_{sh}/4)$ and $t_{max+}=(t_{max}+T_{sh}/4)$ are the modified times to generate the shoot-through states; $S_{X1}$ and $S_{Y1}$ are the switching control signals for the upper switches, $S_{X2}$ and $S_{Y2}$ are the switching control signals for the lower switches, $\{X, Y\} \in \{L, R\}$. In this way, the shoot-through states are distributed into the qZS-HBI module without additional switching actions, losses, and resources.

Figure 19:
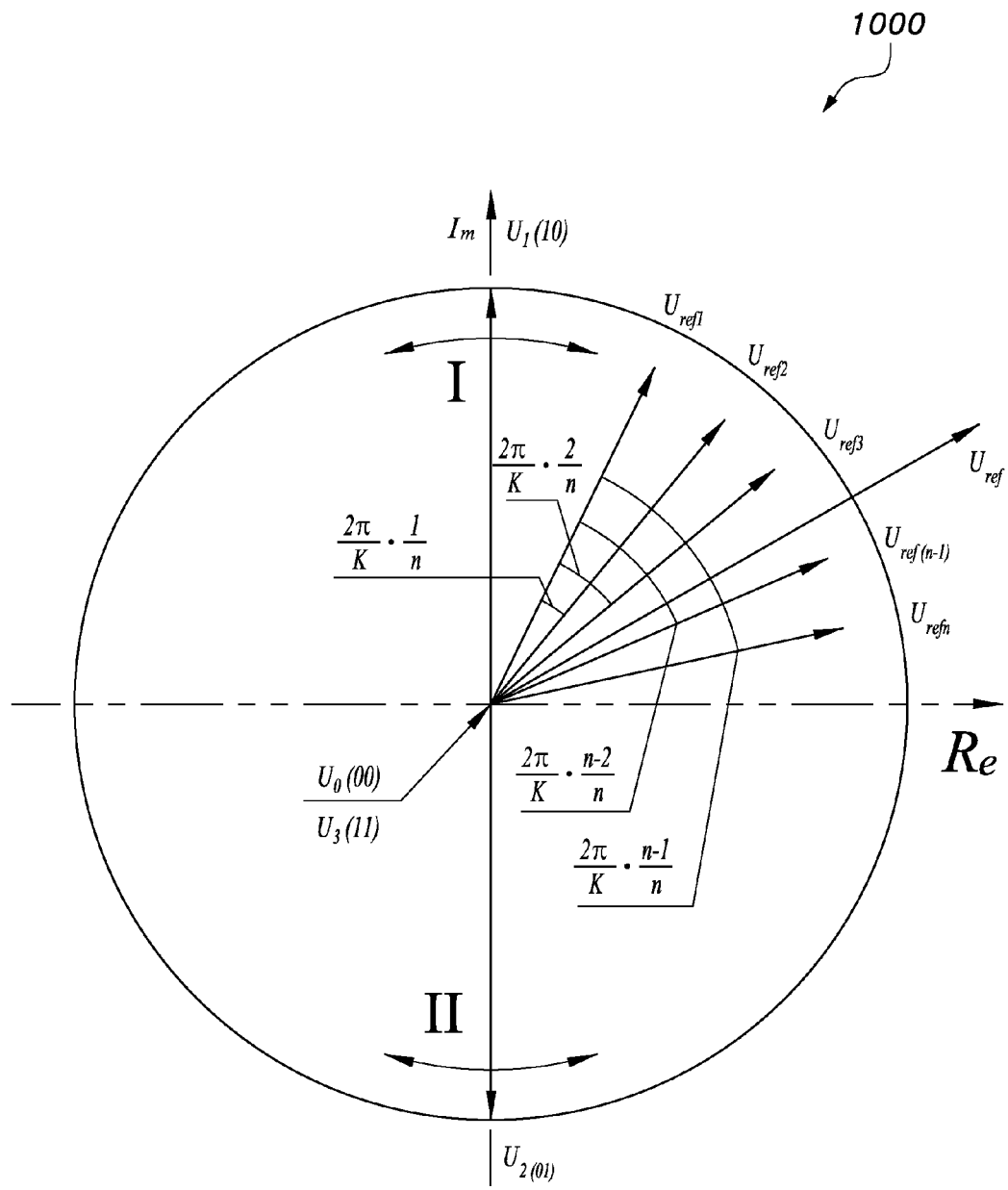
FIG. 19 is a plot showing synthesis of voltage vectors for the qZS-CMI in an implementation of a grid-connected control method for quasi-Z-source (qZS) cascade multilevel inverter-based (CMI-based) photovoltaic (PV) power generation according to the third embodiment of the present invention.

To generate the step-like AC output voltage waveform from the qZS-CMI, a $2\pi/nK$ phase difference in which K is the number of reference voltage vectors in each cycle is employed between any two adjacent voltage vectors, as plot 1000 of FIG. 19 shows. The total voltage vector $U_{ref}$ is composed of n reference vectors $U_{ref1}, U_{ref2}, \ldots, U_{refn}$ from the n qZS-HBI.

Figure 20:
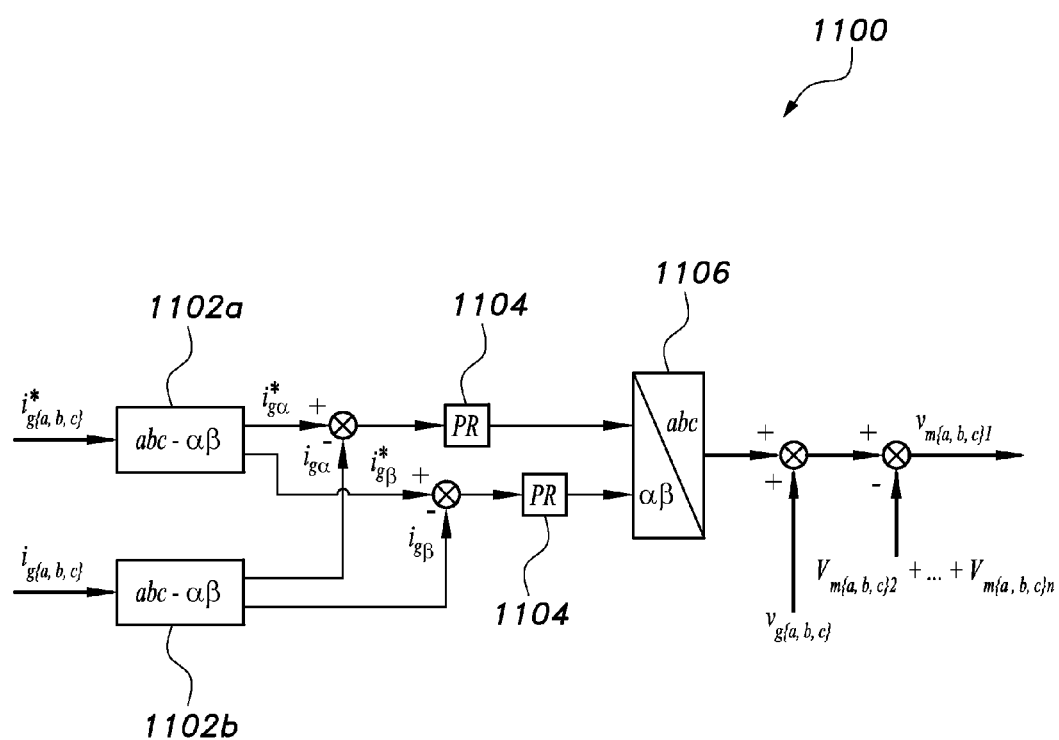
FIG. 20 is a schematic diagram showing a Park transform/inverse transform introduced into the control system for a qZS-CMI-based grid-tie PV power generation system to extend the grid-connected control method for quasi-Z-source (qZS) cascade multilevel inverter-based (CMI-based) photovoltaic (PV) power generation according to the third embodiment of the present invention to a three-phase power grid system.

The present grid-connected control method can also be extended to a three-phase qZS-CMI PV power system by each of three phases applying the same control approach as the single-phase system, while the total grid-tie current loop controller is performed in a two-phase static coordinate system through three-phase to two-phase transformation. The single-phase control approach, as detailed in FIG. 16, is designated as Proportional+Resonant (PR) control 1104 in FIG. 20. As FIG. 20 shows, the three-phase abc reference and real grid-tie current are converted to two-phase a/j static frame by Park transformations 1102a and 1102b. The Proportional+Resonant (PR) control 1104 is applied to cross sums of the result of the Park transformations, and an inverse transform 1106 is applied after PR control 1104. Application of the inverse transform 1106 to αβ-abc results in the three-phase modulation signals $V_{m\{a,b,c\}1}$ for the first module of each phase by subtracting the sum of modulation signals from modules 2 to n in respective phases, i.e., $V_{m\{a,b,c\}2}+ \ldots +V_{m\{a,b,c\}n}$.

In summary, the present grid-connected control method for quasi-Z-source cascade multilevel inverter-based photovoltaic power generation extracts the maximum power from each PV array, transfers all the captured PV power to the grid at unity power factor, and maintains the constant DC-link peak voltage for each qZS-HBI module and balanced DC-link peak voltage among cascaded modules.

It is to be understood that the present invention is not limited to the embodiments described above, but encompasses any and all embodiments within the scope of the following claims.

The invention claimed is:

1. A modular multilevel space vector modulation method for a quasi-Z-source cascade multilevel inverter, comprising the steps of:

generating a first switching signal for an upper left set of switches of each quasi-Z-source H-bridge inverter cell of a quasi-Z-source cascade multilevel inverter at a time $T_0/4-T_{sh}/4$ within a control cycle $T_s$ of the quasi-Z-source H-bridge inverter cell, where $T_0$ is an unmodified switching time interval of a zero state of the quasi-Z-source H-bridge inverter cell and $T_{sh}$ is a time of shoot-through zero states of the quasi-Z-source H-bridge inverter cell;

comparing the first switching signal with a triangular carrier signal over the control cycle $T_s$ and turning the upper left set of switches on if the triangular carrier signal is higher than the first switching signal and turning the upper left set of switches off if the triangular carrier signal is lower than the first switching signal;

generating a second switching signal for an upper right set of switches of the quasi-Z-source H-bridge inverter cell at a time $T_s/2-T_0/4$ within the control cycle $T_s$ of the quasi-Z-source H-bridge inverter cell;

comparing the second switching signal with the triangular carrier signal over the control cycle $T_s$ and turning the upper right set of switches on if the triangular carrier signal is higher than the second switching signal and turning the upper right set of switches off if the triangular carrier signal is lower than the second switching signal;

generating a third switching signal for a lower left set of switches of the quasi-Z-source H-bridge inverter cell at a time $T_0/4$ within the control cycle $T_s$ of the quasi-Z-source H-bridge inverter cell;

comparing the third switching signal with the triangular carrier signal over the control cycle $T_s$ and turning the lower left set of switches on if the triangular carrier signal is higher than the third switching signal and turning the lower left set of switches off if the triangular carrier signal is lower than the third switching signal;

generating a fourth switching signal for a lower right set of switches of the quasi-Z-source H-bridge inverter cell at a time $T_s/2-T_0/4+T_{sh}/4$ within the control cycle $T_s$ of the quasi-Z-source H-bridge inverter cell; and comparing the fourth switching signal with the triangular carrier signal over the control cycle $T_s$ and turning the lower right set of switches on if the triangular carrier signal is higher than the fourth switching signal and turning the lower right set of switches off if the triangular carrier signal is lower than the fourth switching signal.

2. The modular multilevel space vector modulation method for a quasi-Z-source cascade multilevel inverter as recited in claim 1, wherein the quasi-Z-source cascade multilevel inverter comprises a photovoltaic quasi-Z-source cascade multilevel inverter.

3. A pulse-width-amplitude modulation method for multilevel inverters, comprising the steps of:

varying carrier amplitudes for a quasi-Z-source cascade of multilevel inverters (qZS-CMI) between top and bottom amplitudes of three-phase modulating signals for a left inverter H-bridge leg and a right inverter H-bridge leg, respectively, the left and right inverter H-bridge legs each having an upper power switch and a lower power switch;

implementing boost control for a pulse-width-amplitude (PWAM) modulating signal if shoot-through references exceed predetermined minimum and maximum threshold values;

using the shoot-through references and the threshold values to determine a shoot-through duty ratio; and for each of the power switches, determining a phase sector alternately presenting no switching action, shoot-through only, and shoot-through with active modulation, the phase sector determination depending on the shoot-through duty ratio.

4. The pulse-width-amplitude modulation method for multilevel inverters as recited in claim 3, further comprising the steps of, for each of the inverters:

maintaining a fixed switching frequency of the inverter; and modulating the pulse width of the PWAM modulating signal to use as a switching control signal to selectively turn the power switches of the inverter on and off.

5. The pulse-width-amplitude modulation method for a quasi-Z-source cascade multilevel inverter as recited in claim 3, further comprising the steps of, for each of the inverters:

maintaining a fixed switching frequency of the inverter; and modulating the pulse amplitude of the PWAM modulating signal to use as a switching control signal to selectively turn the power switches of the inverter on and off.

6. The pulse-width-amplitude modulation method for a quasi-Z-source cascade multilevel inverter as recited in claim 3, wherein the multilevel inverter comprises a photovoltaic quasi-Z-source cascade multilevel inverter.

7. A grid-connected control method for quasi-Z-source cascade multilevel inverter-based photovoltaic power generator producing single-phase output, the generator having a cascade of photovoltaic (PV) array modules connected to a single-phase power grid, the method comprising the steps of:

for each quasi-Z-source cascade multilevel inverter (qZS-CMI) PV array module of the cascade, providing a phase lock of grid voltage, $v_g$, as a first input to a proportional integral controller of the module;

for a first qZS-CMI PV array module of the cascade, providing a complex conjugate of a time derivative of grid current as a second input to the first PV array module's controller;

feeding an output of the first PV array module's controller to an inner grid-tie current loop to provide a reference value thereof and a total voltage loop modulation reference, $v_{mt}$;

for a second through last qZS-CMI PV array module of the cascade, providing that module's voltage loop as a second input to the corresponding module's controller;

for the second through a next to the last qZS-CMI PV array module of the cascade, summing an output of the corresponding PV array module's controller with the inner grid-tie current reference value to provide space vector modulation signals $v_{m2}$ through $v_{m(n-1)}$;

for the last qZS-CMI PV array module of the cascade, summing an output of the last PV array module's controller with the grid voltage $v_g$ to provide a last space vector modulation signal $v_{mn}$;

for the first qZS-CMI PV array module of the cascade, subtracting a sum of the space vector modulation signals $v_{m2}$ through $v_{mn}$ from the total voltage loop modulation reference $V_{mt}$ to provide a first space vector modulation signal $v_{m1}$; and applying the first through last space vector modulation signals $v_{m1}$, $v_{m2}$ through $v_{m(n-1)}$, and $v_{mn}$ to H-bridge switches of the respective qZS-CMI PV array modules, whereby shoot-through duty ratios of the H-bridge switches are controlled to extract maximum power from each qZS-CMI PV array module, transfer substantially all captured PV power to the power grid at unity power factor, assure a constant DC-link peak voltage for each qZS-CMI PV array module, and assure a balanced DC-link peak voltage among the qZS-CMI PV array modules of the cascade.

* * * * *